US009197798B2

(12) United States Patent
Georgiev

(10) Patent No.: US 9,197,798 B2
(45) Date of Patent: Nov. 24, 2015

(54) THIN PLENOPTIC CAMERAS USING MICROSPHERES

(75) Inventor: Todor G. Georgiev, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 242 days.

(21) Appl. No.: 13/288,759

(22) Filed: Nov. 3, 2011

(65) Prior Publication Data

US 2013/0128077 A1 May 23, 2013

Related U.S. Application Data

(60) Provisional application No. 61/467,795, filed on Mar. 25, 2011.

(51) Int. Cl.
*H04N 5/76* (2006.01)
*H04N 5/225* (2006.01)

(52) U.S. Cl.
CPC ............. *H04N 5/2254* (2013.01); *H04N 5/225* (2013.01)

(58) Field of Classification Search
CPC ............................ H04N 5/225; H04N 5/2254
USPC .............................................. 348/231.99, 135
See application file for complete search history.

(56) References Cited

U.S. PATENT DOCUMENTS

| 725,567 A | 4/1903 | Ives |
| 2,039,648 A | 5/1936 | Ives |
| 3,743,379 A | 7/1973 | McMahon |
| 3,971,065 A | 7/1976 | Bayer |
| 3,985,419 A | 10/1976 | Matsumoto et al. |
| 4,175,844 A | 11/1979 | Glaser-Inbari |
| 4,180,313 A | 12/1979 | Inuiya |
| 4,193,093 A | 3/1980 | St. Clair |
| 4,230,942 A | 10/1980 | Stauffer |
| 4,580,219 A | 4/1986 | Pelc et al. |
| 4,732,453 A | 3/1988 | de Montebello et al. |
| 4,849,782 A | 7/1989 | Koyama et al. |
| 5,076,687 A | 12/1991 | Adelson |

(Continued)

FOREIGN PATENT DOCUMENTS

| CN | 101588437 | 11/2009 |
| CN | 101610353 | 12/2009 |

(Continued)

OTHER PUBLICATIONS

"Final Office Action", U.S. Appl. No. 12/957,312, (Jun. 6, 2013), 16 pages.

(Continued)

*Primary Examiner* — Antoinette Spinks
(74) *Attorney, Agent, or Firm* — Wolfe-SBMC

(57) ABSTRACT

Methods and apparatus for capturing and rendering high-quality photographs using relatively small, thin plenoptic cameras. Plenoptic camera technology, in particular focused plenoptic camera technology including but not limited to super-resolution techniques, and other technologies such as microsphere technology may be leveraged to provide thin form factor, megapixel resolution cameras suitable for use in mobile devices and other applications. In addition, at least some embodiments of these cameras may also capture radiance, allowing the imaging capabilities provided by plenoptic camera technology to be realized through appropriate rendering techniques.

21 Claims, 12 Drawing Sheets

(56) References Cited

U.S. PATENT DOCUMENTS

| | | |
|---|---|---|
| 5,125,750 A | 6/1992 | Corle et al. |
| 5,361,127 A | 11/1994 | Daily |
| 5,400,093 A | 3/1995 | Timmers |
| 5,579,445 A | 11/1996 | Loce et al. |
| 5,659,420 A | 8/1997 | Wakai et al. |
| 5,724,122 A | 3/1998 | Oskotsky |
| 5,729,011 A | 3/1998 | Sekiguchi |
| 5,946,077 A | 8/1999 | Nemirovskiy |
| 5,987,164 A | 11/1999 | Szeliski et al. |
| 6,009,188 A | 12/1999 | Cohen et al. |
| 6,097,394 A | 8/2000 | Levoy et al. |
| 6,097,541 A | 8/2000 | Davies et al. |
| 6,137,535 A | 10/2000 | Meyers |
| 6,137,937 A | 10/2000 | Okano et al. |
| 6,268,846 B1 | 7/2001 | Georgiev |
| 6,301,416 B1 | 10/2001 | Okano et al. |
| 6,317,192 B1 | 11/2001 | Silverbrook et al. |
| 6,339,506 B1 | 1/2002 | Wakelin et al. |
| 6,341,183 B1 | 1/2002 | Goldberg |
| 6,351,269 B1 | 2/2002 | Georgiev |
| 6,476,805 B1 | 11/2002 | Shum et al. |
| 6,570,613 B1 | 5/2003 | Howell |
| 6,738,533 B1 | 5/2004 | Shum et al. |
| 6,804,062 B2 | 10/2004 | Atwater et al. |
| 6,831,782 B2 | 12/2004 | Patton et al. |
| 6,838,650 B1 | 1/2005 | Toh |
| 6,842,297 B2 | 1/2005 | Dowski, Jr. |
| 6,961,075 B2 | 11/2005 | Mindler et al. |
| 7,019,671 B2 | 3/2006 | Kawai |
| 7,054,067 B2 | 5/2006 | Okano et al. |
| 7,085,062 B2 | 8/2006 | Hauschild |
| 7,113,231 B2 | 9/2006 | Conner et al. |
| 7,119,319 B2 | 10/2006 | Noto et al. |
| 7,164,446 B2 | 1/2007 | Konishi |
| 7,167,203 B1 | 1/2007 | Yukawa et al. |
| 7,367,537 B2 | 5/2008 | Ibe |
| 7,470,032 B2 | 12/2008 | Damera-Venkata et al. |
| 7,620,309 B2 | 11/2009 | Georgiev |
| 7,723,662 B2 | 5/2010 | Levoy et al. |
| 7,732,744 B2 | 6/2010 | Utagawa |
| 7,792,423 B2 | 9/2010 | Raskar et al. |
| 7,838,814 B2 | 11/2010 | Minhas et al. |
| 7,872,796 B2 | 1/2011 | Georgiev |
| 7,880,794 B2 | 2/2011 | Yamagata et al. |
| 7,916,934 B2 | 3/2011 | Vetro et al. |
| 7,936,392 B2 | 5/2011 | Ng et al. |
| 7,949,252 B1 | 5/2011 | Georgiev |
| 7,956,924 B2 | 6/2011 | Georgiev |
| 7,962,033 B2 | 6/2011 | Georgiev et al. |
| 7,965,936 B2 | 6/2011 | Raskar et al. |
| 7,978,234 B2 | 7/2011 | Yano et al. |
| 8,019,215 B2 | 9/2011 | Georgiev et al. |
| 8,106,994 B2 | 1/2012 | Ichimura |
| 8,126,323 B2 | 2/2012 | Georgiev et al. |
| 8,155,456 B2 | 4/2012 | Babacan et al. |
| 8,160,439 B2 | 4/2012 | Georgiev et al. |
| 8,189,065 B2 | 5/2012 | Georgiev et al. |
| 8,189,089 B1 | 5/2012 | Georgiev |
| 8,228,417 B1 | 7/2012 | Georgiev et al. |
| 8,237,843 B2 | 8/2012 | Yamamoto et al. |
| 8,243,157 B2 | 8/2012 | Ng et al. |
| 8,289,440 B2 | 10/2012 | Knight et al. |
| 8,290,358 B1 | 10/2012 | Georgiev |
| 8,315,476 B1 | 11/2012 | Georgiev et al. |
| 8,330,848 B2 | 12/2012 | Yamamoto |
| 8,345,144 B1 | 1/2013 | Georgiev et al. |
| 8,379,105 B2 | 2/2013 | Georgiev et al. |
| 8,380,060 B2 | 2/2013 | Georgiev et al. |
| 8,390,728 B2 | 3/2013 | Lim et al. |
| 8,400,555 B1 | 3/2013 | Georgiev et al. |
| 8,401,316 B2 | 3/2013 | Babacan |
| 8,471,920 B2 | 6/2013 | Georgiev et al. |
| 8,502,911 B2 | 8/2013 | Yamamoto et al. |
| 8,559,756 B2 | 10/2013 | Georgiev et al. |
| 8,570,426 B2 | 10/2013 | Pitts et al. |
| 8,611,693 B2 | 12/2013 | Intwala et al. |
| 8,665,341 B2 | 3/2014 | Georgiev et al. |
| 8,724,000 B2 | 5/2014 | Georgiev et al. |
| 8,749,694 B2 | 6/2014 | Georgiev et al. |
| 8,803,918 B2 | 8/2014 | Georgiev et al. |
| 8,817,015 B2 | 8/2014 | Georgiev et al. |
| 8,860,833 B2 | 10/2014 | Georgiev et al. |
| 9,030,550 B2 | 5/2015 | Georgiev |
| 2001/0012149 A1 | 8/2001 | Lin et al. |
| 2001/0050813 A1 | 12/2001 | Allio |
| 2002/0140835 A1 | 10/2002 | Silverstein |
| 2002/0159030 A1 | 10/2002 | Frey et al. |
| 2003/0108821 A1 | 6/2003 | Mei et al. |
| 2003/0117511 A1 | 6/2003 | Belz et al. |
| 2003/0156077 A1 | 8/2003 | Balogh |
| 2003/0231255 A1 | 12/2003 | Szajewski et al. |
| 2004/0114807 A1 | 6/2004 | Lelescu et al. |
| 2004/0218830 A1 | 11/2004 | Kang et al. |
| 2004/0223214 A1 | 11/2004 | Atkinson |
| 2005/0080602 A1 | 4/2005 | Snyder et al. |
| 2005/0088714 A1 | 4/2005 | Kremen |
| 2005/0099504 A1 | 5/2005 | Nayar et al. |
| 2005/0122418 A1 | 6/2005 | Okita et al. |
| 2005/0134699 A1 | 6/2005 | Nagashima et al. |
| 2005/0243178 A1 | 11/2005 | McConica |
| 2006/0061845 A1 | 3/2006 | Lin |
| 2006/0072029 A1 | 4/2006 | Miyatake et al. |
| 2006/0104542 A1 | 5/2006 | Blake et al. |
| 2006/0109282 A1 | 5/2006 | Lin et al. |
| 2006/0171032 A1 | 8/2006 | Nishioka |
| 2006/0177150 A1 | 8/2006 | Uyttendaele et al. |
| 2007/0091197 A1 | 4/2007 | Okayama et al. |
| 2007/0183057 A1 | 8/2007 | Terada et al. |
| 2007/0252074 A1 | 11/2007 | Ng et al. |
| 2007/0258096 A1* | 11/2007 | Cui et al. ............ 356/521 |
| 2007/0285526 A1 | 12/2007 | Mann et al. |
| 2008/0007839 A1 | 1/2008 | Deng et al. |
| 2008/0056549 A1 | 3/2008 | Hamill et al. |
| 2008/0095469 A1 | 4/2008 | Kiser |
| 2008/0107231 A1 | 5/2008 | Miyazaki et al. |
| 2008/0142685 A1 | 6/2008 | Gazeley |
| 2008/0152215 A1 | 6/2008 | Horie et al. |
| 2008/0165270 A1 | 7/2008 | Watanabe et al. |
| 2008/0166063 A1 | 7/2008 | Zeng |
| 2008/0187305 A1 | 8/2008 | Raskar |
| 2008/0193026 A1 | 8/2008 | Horie et al. |
| 2008/0218610 A1 | 9/2008 | Chapman et al. |
| 2008/0247623 A1 | 10/2008 | Delso et al. |
| 2008/0266655 A1* | 10/2008 | Levoy et al. ............ 359/368 |
| 2009/0002504 A1 | 1/2009 | Yano et al. |
| 2009/0027542 A1 | 1/2009 | Yamamoto et al. |
| 2009/0041381 A1 | 2/2009 | Georgiev |
| 2009/0041448 A1 | 2/2009 | Georgiev |
| 2009/0086304 A1 | 4/2009 | Yurlov et al. |
| 2009/0122175 A1 | 5/2009 | Yamagata |
| 2009/0127440 A1 | 5/2009 | Nakai |
| 2009/0128658 A1 | 5/2009 | Hayasaka et al. |
| 2009/0128669 A1 | 5/2009 | Ng et al. |
| 2009/0140131 A1 | 6/2009 | Utagawa |
| 2009/0167922 A1 | 7/2009 | Perlman et al. |
| 2009/0179142 A1 | 7/2009 | Duparre et al. |
| 2009/0185801 A1 | 7/2009 | Georgiev et al. |
| 2009/0190022 A1 | 7/2009 | Ichimura |
| 2009/0268970 A1 | 10/2009 | Babacan et al. |
| 2009/0295829 A1 | 12/2009 | Georgiev et al. |
| 2009/0316014 A1 | 12/2009 | Lim et al. |
| 2010/0013979 A1 | 1/2010 | Golub et al. |
| 2010/0026852 A1 | 2/2010 | Ng et al. |
| 2010/0085468 A1 | 4/2010 | Park et al. |
| 2010/0091133 A1 | 4/2010 | Lim et al. |
| 2010/0097491 A1 | 4/2010 | Farina et al. |
| 2010/0128145 A1 | 5/2010 | Pitts et al. |
| 2010/0141802 A1* | 6/2010 | Knight et al. ............ 348/240.3 |
| 2010/0171866 A1* | 7/2010 | Brady et al. ............ 348/340 |
| 2010/0205388 A1 | 8/2010 | MacInnis |
| 2010/0265381 A1 | 10/2010 | Yamamoto et al. |
| 2010/0265386 A1 | 10/2010 | Raskar et al. |
| 2011/0043604 A1 | 2/2011 | Peleg et al. |
| 2011/0063354 A1 | 3/2011 | Enge |

(56) References Cited

U.S. PATENT DOCUMENTS

| | | | |
|---|---|---|---|
| 2011/0069189 A1 | 3/2011 | Venkataraman et al. | |
| 2011/0109965 A1* | 5/2011 | Gates et al. | 359/478 |
| 2011/0122499 A1* | 5/2011 | Commander et al. | 359/626 |
| 2011/0141224 A1 | 6/2011 | Stec et al. | |
| 2011/0157387 A1 | 6/2011 | Han et al. | |
| 2011/0169980 A1 | 7/2011 | Cho et al. | |
| 2011/0211824 A1 | 9/2011 | Georgiev et al. | |
| 2012/0183232 A1 | 7/2012 | Babacan et al. | |
| 2012/0229679 A1 | 9/2012 | Georgiev et al. | |
| 2012/0281072 A1 | 11/2012 | Georgiev et al. | |
| 2013/0120356 A1 | 5/2013 | Georgiev | |
| 2013/0120605 A1 | 5/2013 | Georgiev | |
| 2013/0121615 A1 | 5/2013 | Intwala | |
| 2013/0127901 A1 | 5/2013 | Georgiev et al. | |
| 2013/0128030 A1 | 5/2013 | Georgiev | |
| 2013/0128068 A1 | 5/2013 | Georgiev et al. | |
| 2013/0128069 A1 | 5/2013 | Georgiev et al. | |
| 2013/0128081 A1 | 5/2013 | Georgiev | |
| 2013/0128087 A1 | 5/2013 | Georgiev et al. | |
| 2013/0342734 A1 | 12/2013 | Georgis et al. | |

FOREIGN PATENT DOCUMENTS

| | | |
|---|---|---|
| CN | 807604 | 7/2011 |
| EP | 1548481 | 6/2005 |
| JP | 7270791 | 10/1995 |
| JP | 2001330769 | 11/2001 |
| JP | 2004239932 | 8/2004 |
| WO | 01/37025 | 5/2001 |
| WO | 2006/057838 | 6/2006 |
| WO | WO-2007044725 | 4/2007 |
| WO | 2007/115281 | 10/2007 |
| WO | WO-2009151903 | 12/2009 |

OTHER PUBLICATIONS

"Final Office Action", U.S. Appl. No. 12/957,320, (Jun. 27, 2013), 16 pages.
"Non-Final Office Action", U.S. Appl. No. 12/690,869, (Mar. 26, 2012), 8 pages.
"Non-Final Office Action", U.S. Appl. No. 12/957,322, (Apr. 24, 2013), 15 pages.
"Notice of Allowance", U.S. Appl. No. 12/690,869, (Jul. 13, 2012), 7 pages.
"Notice of Allowance", U.S. Appl. No. 13/434,189, (Jul. 10, 2013), 8 pages.
Aliaga, et al., "Plenoptic Stitching: A Scalable Method for Reconstructing 30 Interactive Walkthroughs", *Proceedings of the 28th annual conference on Computer graphics and interactive techniques*, (Aug. 2001), pp. 443-450.
Hunt, B. R., "Super-Resolution of Images: Algorithms, Principles, Performance", *International Journal of Imaging Systems and Technology*, vol. 6, (Jan. 1995), 9 pages.
Meng, et al., "An Approach on Hardware Design for Computational Photography Applications based on Light Field Refocusing Algorithm", *Technical Reports CS-2007-15, University of Virginia*, (Nov. 18, 2007), pp. 1-12.
Adelson, T., et al. "Single Lens Stereo with a Plenoptic Camera," IEEE Transactions on Pattern Analysis and Machine, Intelligence 14, 2, Feb. 1992, pp. 99-106.
Ng, R., et al, "Light Field Photography with a Hand-Held Plenoptic Camera," Stanford Univ. Computer Science Tech, Report CSTR Feb. 2005, Apr. 2005, 11 pages.
Ng R.: "Fourier Slice Photography," Proceedings of ACM SIGGRAPH 2005 (Jan 2005), 10 pages.
Lin Z., Shum H.: Fundamental limits of reconstruction-based super-resolution algorithms under local translation. IEEE Transactions on Pattern Analysis and Machine Intelligence 26, 1 (Jan. 2004), 83-97.
Levoy, Mark et al., "Light Field Microscopy," Stanford University, Submitted to Siggraph 2006, 5 pages.
Levoy, Mark, "Optical Recipes for Light Microscopes," Stanford Computer Grpahics Laboratory Technical Memo 2006-001, Jun. 20, 2006, 10 pages.
Levoy M., Hanrahan P.: "Light Field Rendering," ACM Trans. Graph. (1996), 31-42.
M. Levoy, "Light Fields and computational Imaging," Computer [Online], vol. 39, No. 8, Aug. 2006, pp. 46-55, XP002501300.
Georgeiv, et al. "Spatio-Angular Resolution Tradeoff in Integral Photography," Proc. EGSR, 2006, 10 pages.
Georgiev T., Wainer M.: "Morphing Between Multiple Images," Tech. Rep. Apr. 17, 1997, 17 pages.
Georgiev T., Lumsdaine A.: Depth of field in plenoptic cameras. In Eurographics 2009—Annex (Apr. 2009), pp. 5-8.
Brown M., Lowe D. G.: "Unsupervised 3d Object Recognition and Reconstruction in Unordered Datasets," in Proceedings of 5th International Conference on 3D Imaging and Modelling (3DIM) (2005), pp. 21-30.
Gortler S. J., Grzeszczuk R., Szeliski, R., Cohen M. F.: "The Lumigraph," ACM Trans. Graph. (1996), 43-54.
Isaksen A., McMillan L., Gortler S. J.: "Dynamically Reparameterized Light Fields," ACM Trans. Graph. (2000), 297-306.
Lee S., Wolberg G., Shin S.: "Polymorph: Morphing Among Multiple Images," IEEE Computer Graphics and Applications (Jan./Feb. 1998), 14 pages.
Lippmann G.: "Epreuves reversible donnant la sensation du relief ("Reversible Prints Providing the Sensation of Depth")", Journal of Physics 7 (1908), pp. 821-825.
Lippmann G.: "Epreuves Reversibles Photographies Integrales," Academie des sciences (Mar. 1908), pp. 446-451.
Naemura T., Yoshida T., Harashima H.: "3d Computer Graphics Based on Integral Photography," Optics Express, vol. 8,2 (Feb. 6, 2001), 8 pages.
Seitz S. M., Dyer C. R.: "View Morphing," ACM Trans. Graph. (1996), 21-30.
Stevens R., Harvey T.: "Lens Arrays for a Three-dimensional Imaging System," Journal of Optics A, vol. 4 (2002), 5 pages.
Stewart J., Yu J., Gortler S. J., McMillan L.: "A New Reconstruction Filter for Undersampled Light Field," Eurographics Symposium on Rendering (2003), 150-156.
Vaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004), 8 pages.
Wilburn B., Joshi N., Vaish V., Talvala E., Antunez E., Barth A., Adams A., Levoy M., Horowitz M.: "High Performance Imaging Using Large Camera Arrays," In ACM Trans. Graph. (2005), 12 pages.
Xiao J., Shah M.: "Tri-view Morphing," Computer Vision and Image Understanding 96,3 (2004), 345-366.
Zitnick C. L., Jojic N., Kang S.: "Consistent Segmentation for Optical Flow Estimation" In Proceedings of IEEE International Conference on Computer Vision (ICCV) (2005), 8 pages.
Veeraraghavan, et al., "Dappled Photography: Mask Enhanced Cameras for Heterodyned Light Fields and Coded Aperture Refocusing," ACM Transaction on Graphics, vol. 26, No. 3, Article 69, Jul. 2007, 12 pages, XP002491494.
J. Chai, S. Chan, H. Shum, and X. Tong: "Plenoptic Sampling", ACM Trans. Graph., pp. 307-318, 2000.
F. Durand, N. Holzschuch, C. Soler, E. Chan, and F. Sillion: "A frequency Analysis of Light Transport," ACM Trans. Graph., pp. 1115-1126, 2005.
Todor Georgiev and Chintan Intwala: "Light Field Camera Design For Integral View Photography," Adobe Tech. Rep., 2006, 13 pages.
J. Neumann, et al., "Eyes from Eyes Analysis of Camera Design Using Plenoptic Video Geometry," Dec. 2001, 20 pages, XP002509893.
Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, 12 pages.
Yang, J C, et al., "A Real-Time Distributed Light Field Camera," Rendering Techniques 2002, Eurographics Workshop Proceedings, PIS, Italy, Jun. 26-28, 2002, 9 pages.

(56) References Cited

OTHER PUBLICATIONS

Zhang, et al., "A Survey on Image-based Rendering-Representation, Sampling and Compression," Signal Processing, Image Communication, Elsevier Science Publishers, vol. 19, No. 1, Jan. 1, 2004, 28 pages.

Heung-Yeung Shum, et al., "Survey of Image-Based Representations and Compression Techniques," IEEE Transactions on Circuits and Systems for Video Technology, IEEE Service Center, vol. 13, No. 11, Nov. 1, 2003, 18 pages.

Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, 4 pages.

Ulrich, Fecker, et al., "Transposed Picture Ordering for Dynamic Light Field Coding," Joint Video Team (JVT) of ISO/IEC MPEG & ITU-T VGEG (ISO/IEC JTC1/SC29/WG11 and ITU-T SG16 Q6), Jul. 9, 2004, 8 pages.

Grzeszczuk, R., et al., "Standard Support for 1-13 Progressive Encoding, Compression and Interactive Visualization of Surface Light Fields," Joint Video Tern (JVT) of ISO/IEC MPEG & ITU-T VGEG (ISO/IEC JTC1/SC29NVG11 and ITU-T SG16 Q6), Nov. 21, 2001, 11 pages.

Chang, et al., "Light Field Compression Using Disparity-Compensated Lifting and Shape Adaptation," IEEE Transactions on Image Processing, vol. 15, No. 4, Apr. 2006, pp. 793-806.

Sebe, et al., "Mutli-View Geometry Estimation for Light Field Compression," VMV 2002, 8 pages.

Borman, S., and Stevenson, R., "Super-resolution from image sequences—a review", Proceedings of the 1998 Midwest Symposium on Circuits and Systems, Publication Date: Aug. 9-12, 1998, On pp. 374-378.

Elad, M., and Feuer, A., "Restoration of a single superresolution image from several blurred, noisy, and undersampled measured images," IEEE Transactions on Image Processing Dec. 1997, pp. 1646-1658.

Farsiu, S., Robinson, D., Elad, M., and Milanfar, P., "Advances and challenges in super-resolution," International Journal of Imaging Systems and Technology, 2004, 12 pages.

Park, S., Park, M., and Kang, M., "Super-resolution image reconstruction: a technical overview," Signal Processing Magazine, 2003, 16 pages.

David E. Roberts, History of Lenticular and Related Autostereoscopic Methods, 2003, 17 pages.

Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.

Lumsdaine A., Georgiev T.: Full Resolution Lightfield Rendering. Tech. rep., Adobe Systems, Jan. 2008, 12 pages.

Baker S., Kanade T.: Limits on superresolution and how to break them. IEEE Transactions on Pattern Analysis and Machine Intelligence (Jan. 2002), 377 pages.

Bishop T. E., Zanetti S., Favaro P.: Light field superresolution. In International Conference on Computational Photography (Apr. 16-17, 2009), 4 pages.

Levin A., Fergus R., Durand F., Freeman W.: Image and depth from a conventional camera with a coded aperture. ACM Transactions on Graphics, SIGGRAPH 2007 Conference Proceedings, San Diego, CA (2007), 10 pages.

Ng, "Digital Light Field Photography," Jul. 2006, A Dissertation Submitted to the Dept. of Computer Science and the Committee on Graduate Studies of Stanford Univ in Partial fulfillment of the requirements for the degree of Doctor of Philosophy, 203.

Lumsdaine A., Georgiev T.: The focused plenoptic camera. In International Conference on Computational Photography (Apr. 2009), 8 pages.

Ng M. K., Bose N. K: Mathematical analysis of super-resolution methodology. Signal Processing Magazine, IEEE 20, 3 (2003), 62-74.

Schultz R.: Super-resolution enhancement of native digital video versus digitized NTSC sequences. In Proceedings of the Fifth IEEE Southwest Symposium on Image Analysis and Interpretation (2002), pp. 193-197.

Levoy, et al. "Recording and controlling the 4D light field in a microscope using microlens arrays", Journal of Microscopy, 2009, 19 pages.

Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.

Shree K. Nayar, Vlad Branzoi, Terry E. Boult, "Programmable Imaging using a Digital Micromirror Array", Shree K. Nayar, Vlad Branzoi, Terry E. Boult, In Conf. on Computer Vision and Pattern Recognition, pp. I: 436-443, 2004.

U.S. Appl. No. 12/574,183, filed Oct. 6, 2009, Adobe Systems Incorporated, all pages.

U.S. Appl. No. 12/957,326, filed Nov. 30, 2010, Adobe Systems Incorporated, all pages.

U.S. Appl. No. 12/917,984, filed Nov. 2, 2010, Adobe Systems Incorporated, all pages.

U.S. Appl. No. 12/957,308, filed Nov. 30, 2010, Adobe Systems Incorporated, all pages.

U.S. Appl. No. 11/874,611, filed Oct. 18, 2007, Adobe Systems Incorporated, all pages.

U.S. Appl. No. 12/111,735, filed Apr. 29, 2008, Adobe Systems Incorporated, all pages.

U.S. Appl. No. 12/790,677, filed May 28, 2010, Adobe Systems Incorporated, all pages.

U.S. Appl. No. 12/474,112, filed May 28, 2009, Adobe Systems Incorporated, all pages.

U.S. Appl. No. 12/130,725, filed May 30, 2008, Adobe Systems Incorporated, all pages.

U.S. Appl. No. 12/628,437, filed Dec. 1, 2009, Adobe Systems Incorporated, all pages.

U.S. Appl. No. 12/690,869, filed Jan. 20, 2010, Adobe Systems Incorporated, all pages.

U.S. Appl. No. 12/690,871, filed Jan. 20, 2010, Adobe Systems Incorporated, all pages.

U.S. Appl. No. 12/503,803, filed Jul. 15, 2009, Adobe Systems Incorporated, all pages.

S Todt, C Rezk-Salama, A Kolb, and K.-D Kuhnert, "Fast (Spherical) Light Field Rendering with Per-Pixel Depth," Technical Report, Computer Graphics Group, University of Siegen, 2007, 8 pages.

John Kessenich, Dave Baldwin, Randi Rost. The OpenGL Shading Language, Version: 4.00, Document Revision: 7, Feb. 12, 2010, 160 pages.

Mark Segal, Kurt Akeley. The OpenGL Graphics System: A Specification (Version 3.2 (Core Profile)—Dec. 7, 2009), 104 pages.

"PyOpenGL, The Python OpenGL® Binding" downloaded from http://pyopengl.sourceforge.net/ on Dec. 21, 2010, 2 pages.

T. Adelson and J. Bergen, "The plenoptic function and the elements of early vision," in Computational models of visual processing (MIT Press, 1991), 18 pages.

Tanida, J. Yamada, K., "TOMBO: thin observation module by bound optics," Lasers and Electro-Optics Society, 2002. LEOS 2002. The 15th Annual Meeting of the IEEE, Issue Date: 2002, pp. 233-234 vol. 1.

M Christensen, M Haney, D Rajan, S Douglas, and S Wood, "Panoptes: a thin agile multi-resolution imaging sensor," Government Microcuircuit Applications and Critical, Technology Conference (GOMACTech-05)(Jan. 2005), 4 pages.

D Capel and A Zisserman, "Computer vision applied to super resolution," Signal Processing Magazine(Jan. 2003), 10 pages.

P Sloan, M Cohen, and S Gortler, "Time critical lumigraph rendering," Proceedings of the 1997 symposium on Interactive 3D graphics (Jan. 1997), 7 pages.

John Nickolls, Ian Buck, Michael Garland, and Kevin Skadron, "Scalable parallel programming with cuda," Queue 6, 40-53 (2008), 40 pages.

(56) References Cited

OTHER PUBLICATIONS

John E. Stone, David Gohara, and Guochun Shi, "OpenCL—The open standard for parallel programming of heterogeneous systems." Comput. in Sci. and Eng., 12:66-73, 2010, 66 pages.

Georgiev, et al. "Light-Field Capture by Multiplexing in the Frequency Domain," Adobe Technical Report, Apr. 2007, all pages.

"Optical virtual imaging at 50 nm lateral resolution with a white-light nanoscope," Zengbo Wang, Wei Guo, Lin Li, Boris Luk'yanchuk, Ashfaq Khan, Zhu Liu, Zaichun Chen, Minghui Hong, Nature Communications, Published Mar. 1, 2011, 13 pages.

"The optical microscopy with virtual image breaks a record: 50-nm resolution imaging is demonstrated," Zengbo Wang, Wei Guo, Lin Li, Zhu Liu, Boris Luk'yanchuk, Zaichun Chen, Minghui Hong, Jun. 2010, Cornell University Library, http://arxiv.org/abs/1006.4037v1, 7 pages.

"Direct imaging of photonic nanojets," Patrick Ferrand, JeromeWenger, Alexis Devilez, Martina Pianta, Brian Stout, Nicolas Bonod, Evgueni Popov, Nerve Rigneault, Opt. Express 16, 6930-6940 (2008).

Qiang Wu, G. D. Feke, Robert D. Grober, L. P. Ghislain, "Realization of numerical aperture 2.0 using a gallium phosphide solid immersion lens," Applied Physics Letters 75 (1999): 4064-4066.

Imaging with solid immersion lenses, spatial resolution, and applications, Q. Wu, L. P. Ghislain, and V. B. Elings, Proc. IEEE 88, 1491 (2000), 8 pages.

"European Search Report", EP Application No. 09159086.9, (Aug. 14, 2009), 8 pages.

"Final Office Action", U.S. Appl. No. 13/425,306, (Sep. 19, 2012), 7 pages.

"Final Office Action", U.S. Appl. No. 12/130,725, (Jan. 3, 2012), 6 pages.

"Non-Final Office Action", U.S. Appl. No. 12/957,316, (Mar. 22, 2013), 16 pages.

"Non-Final Office Action", U.S. Appl. No. 12/111,735, (Jul. 28, 2011), 12 pages.

"Non-Final Office Action", U.S. Appl. No. 12/130,725, (Sep. 9, 2011), 7 pages.

"Non-Final Office Action", U.S. Appl. No. 12/186,392, (Apr. 3, 2012), 13 pages.

"Non-Final Office Action", U.S. Appl. No. 12/186,392, (Nov. 19, 2012), 13 pages.

"Non-Final Office Action", U.S. Appl. No. 12/271,389, (Sep. 30, 2010), 7 pages.

"Non-Final Office Action", U.S. Appl. No. 12/474,112, (Oct. 19, 2011), 5 pages.

"Non-Final Office Action", U.S. Appl. No. 12/628,437, (Jul. 30, 2012), 10 pages.

"Non-Final Office Action", U.S. Appl. No. 12/957,312, (Nov. 13, 2012), 14 pages.

"Non-Final Office Action", U.S. Appl. No. 12/957,320, (Dec. 5, 2012), 11 pages.

"Non-Final Office Action", U.S. Appl. No. 13/103,880, (Aug. 9, 2011), 5 pages.

"Non-Final Office Action", U.S. Appl. No. 13/425,306, (May 31, 2012), 7 pages.

"Non-Final Office Action", U.S. Appl. No. 13/434,189, (Mar. 7, 2013), 8 pages.

"Non-Final Office Action", U.S. Appl. No. 13/476,638, (Jul. 6, 2012), 6 pages.

"Notice of Allowance", U.S. Appl. No. 12/917,984, (Aug. 21, 2012), 11 pages.

"Notice of Allowance", U.S. Appl. No. 12/111,735, (Dec. 14, 2011), 10 pages.

"Notice of Allowance", U.S. Appl. No. 12/130,725, (Apr. 3, 2012), 8 pages.

"Notice of Allowance", U.S. Appl. No. 12/186,392, (Mar. 13, 2013), 8 pages.

"Notice of Allowance", U.S. Appl. No. 12/271,389, (Feb. 2, 2011), 4 pages.

"Notice of Allowance", U.S. Appl. No. 12/271,389, (Jun. 18, 2010), 6 pages.

"Notice of Allowance", U.S. Appl. No. 12/474,112, (Jan. 30, 2012), 5 pages.

"Notice of Allowance", U.S. Appl. No. 12/503,803, (Mar. 20, 2012), 6 pages.

"Notice of Allowance", U.S. Appl. No. 12/628,437, (Dec. 18, 2012), 6 pages.

"Notice of Allowance", U.S. Appl. No. 13/103,880, (Dec. 13, 2011), 5 pages.

"Notice of Allowance", U.S. Appl. No. 13/425,306, (Dec. 10, 2012), 4 pages.

"Notice of Allowance", U.S. Appl. No. 13/429,226, (Dec. 26, 2012), 7 pages.

"Notice of Allowance", U.S. Appl. No. 13/476,638, (Oct. 29, 2012), 4 pages.

"Notice of Allowance", U.S. Appl. No. 13/549,330, (Feb. 7, 2013), 9 pages.

"Restriction Requirement", U.S. Appl. No. 12/111,735, (Apr. 29, 2011), 6 pages.

"Restriction Requirement", U.S. Appl. No. 12/130,725, (Jul. 15, 2011), 5 pages.

"Restriction Requirement", U.S. Appl. No. 12/474,112, (Jul. 28, 2011), 6 pages.

"Restriction Requirement", U.S. Appl. No. 12/957,316, (Jan. 23, 2013), 6 pages.

"Supplemental Notice of Allowance", U.S. Appl. No. 12/271,389, (Feb. 10, 2011), 2 pages.

"Supplemental Notice of Allowance", U.S. Appl. No. 12/474,112, (Mar. 8, 2012), 2 pages.

"Supplemental Notice of Allowance", U.S. Appl. No. 12/503,803, (Apr. 23, 2012), 13 pages.

"Supplemental Notice of Allowance", U.S. Appl. No. 13/103,880, (Jan. 20, 2012), 2 pages.

U.S. Appl. No. 11/627,141, filed Jan. 25, 2007, 43 pages.
U.S. Appl. No. 12/186,396, filed Aug. 5, 2008, 69 pages.
U.S. Appl. No. 12/271,389, filed Nov. 14, 2008, 63 pages.
U.S. Appl. No. 12/636,168, filed Dec. 11, 2009, 60 pages.
U.S. Appl. No. 12/690,569, filed Jan. 20, 2010, 36 pages.
U.S. Appl. No. 12/957,312, filed Nov. 30, 2010, 91 pages.
U.S. Appl. No. 12/957,316, filed Oct. 30, 2010, 66 pages.
U.S. Appl. No. 12/957,320, filed Nov. 30, 2010, 58 pages.
U.S. Appl. No. 12/957,322, filed Nov. 30, 2010, 53 pages.
U.S. Appl. No. 13/288,759, filed Nov. 3, 2011, 54 pages.
U.S. Appl. No. 13/288,765, filed Nov. 3, 2011, 50 pages.
U.S. Appl. No. 13/429,765, filed Mar. 23, 2012, 44 pages.
U.S. Appl. No. 13/429,226, filed Mar. 23, 2012, 44 pages.

Aggarwal, Manoj et al., "Split Aperture Imaging for High Dynamic Range", *International Journal of Computer Vision*, (Jan. 2004), 8 pages.

Debevec, Paul E., et al., "Recovering High Dynamic Range Radiance Maps from Photographs", *ACM Transaction on Graphics, SIGGRAPH 1997 Conference Proceedings*, San Diego, CA, (1997), 10 pages.

Durand, Fredo "Fast Bilateral filtering for the Display of High-Dynamic-Range Images", *ACM Transactions on Graphics (TOG), Proceedings of the 29th Annual Conference on Computer Graphics and Interactive Techniques SIGGRAPH-02*, vol. 21, Issue 3, (2002), 10 pages.

Georgiev, U.S. Appl. No. 12/144,411, filed Jun. 23, 2008, 63 pages.

Guttosch, Rudolph J., "Investigation of Color Aliasing of High Spatial Frequencies and Edges for Bayer-Pattern Sensors and Foveon X3 Direct Image Sensors", *Tech. Rep., Foveon*, 2002, 8 pages.

Horstmeyer, R et al., "Flexible multimodal camera using a light field architecture.", In *Proceedings ICCP* 2009, pp. 1-8.

Horstmeyer, Roarke et al., "Modified light field architecture for reconfigurable multimode imaging", In *Adaptive Coded Aperture Imaging, Non-Imaging, and Unconventional Imaging Sensor Systems. SPIE*, 2009., 9 pages.

Horstmeyer, Roarke et al., "Pupil plane multiplexing for multi-domain imaging sensors.", In *Society of Photo-Optical Instrumentation Engineers (SPIE) Conference Series*, vol. 7096, Aug. 2008., 10 pages.

(56) References Cited

OTHER PUBLICATIONS

Hubel, Paul M., "Foveon Technology and the Changing Landscape of Digital Cameras", *Thirteenth Color Imaging Conference: Color Science and Engineering Systems, Technologies, and Applications*, Scottsdale, Arizona, (Nov. 2005), pp. 314-317.

Hubel, Paul M., et al., "Spatial Frequency Response of Color Image Sensors: Bayer Color Filters and Foveon X3", *Proceedings of the SPIE*, vol. 5301, (2004), pp. 1-4.

Lippmann, "Reversible Prints", *Academie des sciences*, (Mar. 1908),3 pages.

Lyon, Richard F., et al., "Eyeing the Camera: into the Next Century", In *Proceedings IS&T/SID 10th Color Color Imaging Conference*, (2002), 7 pages.

Narasimhan, Srinivasa G., et al., "Enhancing reseolution along multiple imaging dimensions using assortd pixels.", *IEEE Trans. Pattern Anal. Mach. Intel I.*, 27(4), Apr. 2005, pp. 518-530.

Nayar, et al., "High Dynamic Range Imaging: Spatially Varying Pixel Exposures", *IEEE Conference on Computer Vision and Pattern Recognition*, Jun. 2000, vol. 1, pp. 4 72-4 79., (Jun. 2000), 8 pages.

Park, Jong H., et al., "An Ultra Wide Dynamic Range CMOS Image Sensor with a Linear Response", *Proceedings SPIE-IS&T Electronic Imaging, SPIE* vol. 6068, 2006., 8 pages.

Schechner, Yoav Y., et al., "Generalized mosaicing", In *ICCV*, pp. 17-25, 2001., 8 pages.

Schechner, Yoav Y., et al., "Generalized Mosaicing: High Dynamic Range in a Wide Field of View", *International Journal of Computer Vision*, 53(3):245-267, (2003), 23 pages.

Schechner, Yoav Y., et al., "Generalized mosaicing: Polarization panorama", *IEEE Trans. Pattern Anal. Mach. Intell.*, 27(4):631-636, 2005., pp. 631-636.

Schechner, Yoaz et al., "Generalized mosaicing: Wide field of view multispectral imaging", *IEEE Trans. Pattern Anal. Mach. Intell.*, 24(1 0):1334-1348, 2002., (Oct. 2002), pp. 1334-1348.

Tumblin, Jack et al., "LCIS: A Boundary Hierarchy For Detail-Preserving Contrast Reduction", *ACM Transactions on Graphics, SIGGRAPH 1999 Conference Proceedings*, Los Angeles, CA, pp. 83-90, 1999., pp. 83-90.

JP504669 (1975), all pp., english equivalent is U.S. Pat. No. 3,985,419, dated Oct. 12, 1976 by Matsumoto, et al.

"Notice of Allowance", U.S. Appl. No. 12/957,320, Oct. 16, 2013, 10 pages.

"Notice of Allowance", U.S. Appl. No. 12/957,316, Dec. 11, 2013, 13 pages.

"Final Office Action", U.S. Appl. 12/957,312, Dec. 13, 2013, 15 pages.

"Final Office Action", U.S. Appl. No. 12/957,322, Aug. 12, 2013, 16 pages.

"Final Office Action", U.S. Appl. No. 12/957,316, Sep. 26, 2013, 16 pages.

"Non-Final Office Action", U.S. Appl. No. 12/957,312, Aug. 28, 2013, 17 pages.

"Non-Final Office Action", U.S. Appl. No. 12/957,308, Jul. 25, 2013, 18 pages.

"Supplemental Notice of Allowance", U.S. Appl. No. 12/186,392, Aug. 27, 2013, 2 pages.

"Non-Final Office Action", U.S. Appl. No. 12/957,322, Jan. 13, 2014, 20 pages.

"Final Office Action", U.S. Appl. No. 12/957,308, Nov. 19, 2013, 21 pages.

"Supplemental Notice of Allowance", U.S. Appl. No. 12/186,392, Jul. 19, 2013, 5 pages.

"Restriction Requirement", U.S. Appl. No. 12/957,326, Nov. 25, 2013, 6 pages.

Chang, et al.,"Super-Resolution through Neighbor Embedding", Computer Vision and Pattern Recognition, 2004. CVPR 2004. Proceedings of the 2004 IEEE Computer Society Conference, Jul. 2004, 8 pages.

"Non-Final Office Action", U.S. Appl. No. 12/957,326, Feb. 24, 2014, 8 pages.

"Notice of Allowance", U.S. Appl. No. 12/957,308, Mar. 28, 2014, 7 pages.

"Notice of Allowance", U.S. Appl. No. 12/957,312, Feb. 26, 2014, 12 pages.

"Supplemental Notice of Allowance", U.S. Appl. No. 12/957,320, Jan. 24, 2014, 2 pages.

"Supplemental Notice of Allowance", U.S. Appl. No. 12/957,320, Jan. 30, 2014, 2 pages.

"Non-Final Office Action", U.S. Appl. No. 13/288,765, Jun. 25, 2014, 20 pages.

"Notice of Allowance", U.S. Appl. No. 12/957,322, Apr. 25, 2014, 7 pages.

"Notice of Allowance", U.S. Appl. No. 12/957,326, May 30, 2014, 8 pages.

"Notice of Allowance", U.S. Appl. No. 13/466,904, Jul. 18, 2014, 8 pages.

"Supplemental Notice of Allowance", U.S. Appl. No. 12/957,308, Jun. 9, 2014, 2 pages.

"Final Office Action", U.S. Appl. No. 13/288,765, Oct. 23, 2014, 17 pages.

"Notice of Allowance", U.S. Appl. No. 13/288,765, Feb. 2, 2015, 6 pages.

\* cited by examiner

THIN PLENOPTIC CAMERAS USING MICROSPHERES

PRIORITY INFORMATION

This application claims benefit of priority of U.S. Provisional Application Ser. No. 61/467,795 entitled "Thin Cameras Using Plenoptic Technology" filed Mar. 25, 2011, the content of which is incorporated by reference herein in its entirety.

BACKGROUND

Description of the Related Art

There is demand to make mobile devices such as cell phones and PDAs thinner, even as thin as a credit card. Mobile devices may include conventional small cameras. However, due to limitations of conventional camera technology, small cameras used in such devices tend to capture images at lower resolutions and/or with lower image quality than can be achieved with larger, higher quality cameras. Making these conventional cameras thinner to work in thinner mobile devices tends to further degrade the quality and resolution of images that can be captured with conventional camera technology. Thus, there is a need for camera technology that may be integrated in thin devices that, while small and thin, capture higher resolution, higher quality images. However, for optical reasons, cameras with F/numbers lower than 1 are very hard to achieve. (The F/number is defined as the distance from the main lens to the photosensitive surface divided by the aperture of the main lens.) Practically, cameras may be limited to F/numbers not much lower than 2. With the practical limitation that the F/number needs to be about 2 or larger, such a camera would need to be small and thin (5 mm or less). A problem is that conventional small cameras tend to employ small pixels to achieve the same pixel count as in larger cameras. However, pixels cannot be smaller than the wavelength of light (~500 nanometers) or the diffraction limit of the main lens of the camera. These thresholds on pixel size, along with other factors, have limited attempts to shrink the conventional camera while still providing images of sufficient quality and resolution.

Plenoptic Cameras

In contrast to conventional cameras, plenoptic, or radiance capturing, cameras sample the four-dimensional (4-D) optical phase space, and in doing so capture information about the directional distribution of the light rays. This information captured by plenoptic cameras may be referred to as the light-field, the plenoptic function, or radiance. In computational photography, a light-field (which may also be referred to as radiance) is a 4-D record of all light rays in 3-D. Radiance describes both spatial and angular information, and is defined as density of energy per unit of area per unit of stereo angle (in radians). A plenoptic camera captures radiance in plenoptic images (also referred to as flat images, or flats). When processed, plenoptic images may be digitally refocused, noise may be reduced, viewpoints may be changed, and other plenoptic effects may be achieved. Note that, in the literature, plenoptic cameras may be also referred to as light-field cameras, and plenoptic images may also be referred to as light-field images.

The light-field is the radiance density function describing the flow of energy along all rays in three-dimensional (3D) space. Since the description of a ray's position and orientation requires four parameters (e.g., two-dimensional positional information and two-dimensional angular information), the radiance is a four-dimensional (4D) function. This function may be referred to as the plenoptic function. Image photosensor technology, on the other hand, is only two-dimensional, and 4D radiance must therefore be captured and represented in flat (two dimensional) form. A variety of techniques have been developed to transform and capture the 4D radiance in a manner compatible with 2D photosensor technology. This may be referred to as a flat representation of the 4D radiance (or light-field), or simply as a flat.

SUMMARY

Various embodiments of methods and apparatus for capturing and rendering high-quality photographs using relatively small, thin plenoptic cameras are described. Several embodiments of thin cameras implementing plenoptic camera technology are described that may, for example, be suitable for use in small mobile devices such as cell phones, smart phones, and personal digital assistants (PDAs), including mobile devices with thin form factors. While thin (~3 mm-~5 mm), these plenoptic cameras may capture high-resolution raw plenoptic images (flats) from which quality output images may be generated using appropriate rendering techniques as described herein. The quality of images produced using these thin plenoptic cameras and rendering techniques may be superior to that achievable from conventional small cameras typically used in such devices. In addition, since these thin plenoptic cameras implement plenoptic camera technology and thus capture radiance, these thin plenoptic cameras may provide several imaging capabilities that may be desirable in mobile devices, including but not limited to full 3D imaging, refocusabilty, and High Dynamic Range (HDR) imaging.

Embodiments of thin (e.g., ~5 mm) plenoptic cameras are described that integrate microsphere technology with plenoptic camera technology to overcome limitations of diffraction-limited optics, allowing pixel size to be effectively reduced in the plenoptic cameras, which in turn allows the plenoptic camera's thickness to be reduced to at least ~5 mm, suitable for use in thin mobile devices and other applications. The reduction in pixel size provided by this technology allows plenoptic cameras to be made much thinner, e.g. up to 10× thinner, than previously possible, while producing high-resolution, sharp output images. In addition, these thin plenoptic cameras may capture full radiance information, allowing plenoptic techniques such as 3D imaging, refocusing, HDR imaging, and so on to be applied to the captured image data.

In embodiments of these thin plenoptic cameras, light from a scene is received at the main lens of the camera. The received light is refracted by the main lens, for example a single main lens of aperture around F/2, towards a photosensor. The main lens may form an image plane either in front of the photosensor (Keplerian mode) or behind the photosensor (Galilean mode). A plurality of microspheres at or near the photosensor affect the light to decrease the pixel size at the photosensor. For example, the pixel size may be reduced to within a range of ~50 nm (nanometers) to ~100 nm. Since the pixel size of the sensor may be greater than 500 nm, or more generally greater than the size of the reduced pixels, a mask with small holes (e.g., ~50 nm to ~100 nm holes) at each pixel element of the photosensor may be used with the microspheres. Microimages projected by the optical elements of the camera onto the photosensor are captured at different regions of the photosensor to generate a flat. The captured flat, or raw image data, may be rendered according to a super-resolution rendering technique.

Figure 1:
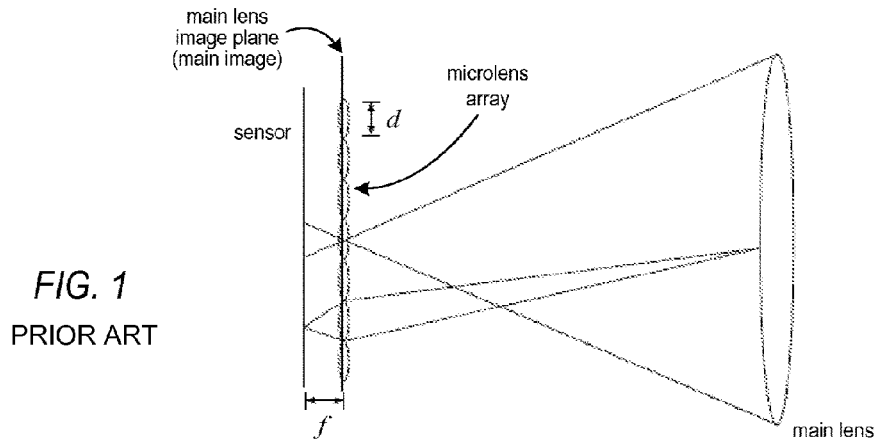
FIG. 1 illustrates a conventional plenoptic camera.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for capturing and rendering high-quality photographs using relatively small, thin plenoptic cameras are described. Several embodiments of thin plenoptic cameras implementing plenoptic camera technology are described that may, for example, be suitable for use in small mobile devices such as cell phones and PDAs, including mobile devices with thin form factors. While thin (~3 mm-~5 mm), these plenoptic cameras may capture high-resolution raw images from which quality output images may be generated using appropriate rendering techniques as described herein. The quality of images produced using these cameras and rendering techniques may be superior to that achievable from conventional small cameras typically used in such devices. In addition, since these thin plenoptic cameras implement plenoptic camera technology and thus capture radiance, these cameras may provide several imaging capabilities that may be desirable in mobile devices, including but not limited to full 3D imaging, refocusabilty, and High Dynamic Range (HDR) imaging.

This document first describes plenoptic camera technology, including a description of focused plenoptic technology and of super-resolution techniques for rendering images from raw plenoptic images or flats captured using a focused plenoptic camera. Embodiments are then described that leverage plenoptic camera technology, in particular focused plenoptic camera technology including but not limited to super-resolution techniques, and other technologies such as microsphere technology and solid immersion lens (SIL) technology to provide thin form factor, megapixel resolution plenoptic cameras suitable for use in mobile devices and other applications. In addition, at least some embodiments of these thin plenoptic cameras may also capture radiance, allowing the imaging capabilities provided by plenoptic camera technology to be realized through appropriate rendering techniques.

Conventional Plenoptic Cameras

FIG. 1 illustrates a conventional plenoptic camera. Note that the components shown in this Figure are not necessarily to scale relative to each other. A conventional plenoptic camera includes a main lens and a microlens array placed at distance f in front of a photosensor. The microlenses have aperture d and focal length f, and are assumed to be equally spaced at interval d. The main lens is focused at the microlens plane, and the microlenses are focused at optical infinity (equivalently, at the main lens).

Considering that the focal length of the main camera lens is much greater than the focal length of the microlenses, each "microcamera" is focused at the main camera lens aperture, and not on the object being photographed. Each microlens image is thus completely defocused relative to that object, and represents only the angular distribution of the radiance. As a rule, these microimages look blurry and do not represent a human-recognizable image. Since each microlens image samples a given location depending on its position and spans the same angular range, rendering an output image from a conventional plenoptic camera radiance image can be accomplished by integrating all of the pixels under each microlens. Integrating a fixed portion of the pixels under each microlens generates an image of one certain view. In all cases, each microlens contributes to a single pixel in the final image.

The Focused Plenoptic Camera

Embodiments of a focused plenoptic camera and of methods for rendering flats captured with the focused plenoptic camera are described in U.S. patent application Ser. No. 12/474,112, entitled "Methods and Apparatus for Full-Resolution Light-Field Capture and Rendering" filed May 28, 2009, which is incorporated by reference herein in its entirety. Embodiments of a focused plenoptic camera and of super-resolution techniques for the focused plenoptic camera are described in U.S. patent application Ser. No. 12/690,869, entitled "Super-Resolution with the Focused Plenoptic Camera" filed Jan. 20, 2010, which is incorporated by reference herein in its entirety, in U.S. patent application Ser. No. 12/957,312, entitled "Methods and Apparatus for Rendering Focused Plenoptic Camera Data using Super-Resolved Demosaicing" filed Nov. 30, 2010, which is incorporated by reference herein in its entirety, and in U.S. patent application Ser. No. 12/957,316, entitled "Methods and Apparatus for Super-Resolution in Integral Photography" filed Nov. 30, 2010, which is incorporated by reference herein in its entirety. A brief discussion of the focused plenoptic camera is provided below.

Focused plenoptic camera technology may be used to capture raw plenoptic images (referred to a flats) from which high-resolution quality images can be generated using appropriate rendering techniques, for example super-resolution techniques as described in the above-noted patent applications. Flats carry a significant amount of information. This information can be used to generate novel effects when rendering. In the focused plenoptic camera (see, e.g., FIGS. 2A and 2B), deliberate spatio-angular trade-offs may be made to obtain significant improvements in spatial resolution when compared to conventional plenoptic cameras. The focused plenoptic camera works as an array of cameras (technically, an array of microcameras). These microcameras are focused on the photographed object, a unique feature that distinguishes the focused plenoptic camera from conventional plenoptic cameras. Based on this feature, super-resolution techniques may be applied to the focused plenoptic camera and to the rendering of flats captured by the focused plenoptic camera.

Figure 2A:
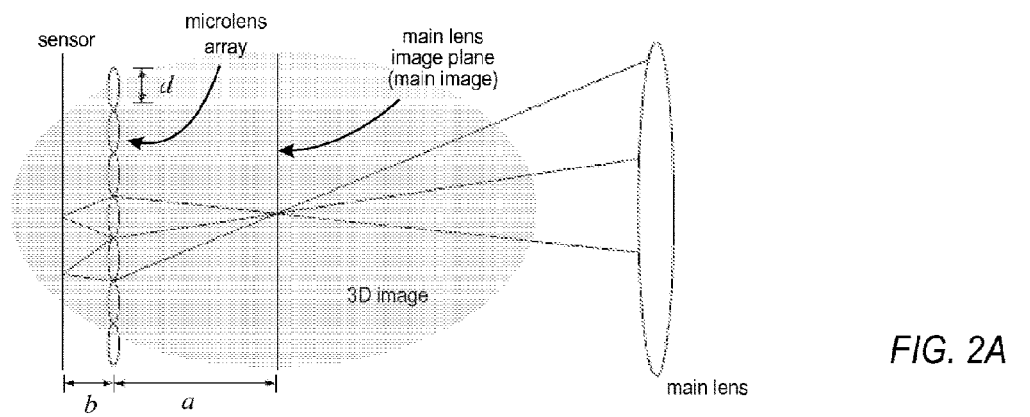
FIG. 2A illustrates an example focused plenoptic camera (Keplerian telescopic case), according to some embodiments.
Figure 2B:
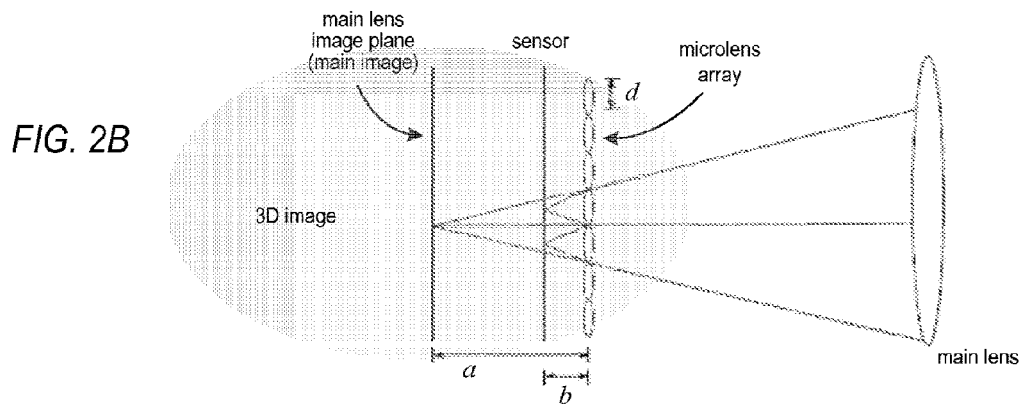
FIG. 2B illustrates an example focused plenoptic camera (Galilean telescopic case), according to some embodiments.

FIGS. 2A and 2B illustrate example focused plenoptic cameras, according to some embodiments. Note that the components shown in FIGS. 2A and 2B are not necessarily to scale relative to each other, nor are the distances between the components necessarily to scale, nor are the sizes of the components necessarily to scale. The focused plenoptic camera may include at least a main lens, a microlens array, and a photosensor. However, in the focused plenoptic camera, the array of "microcameras" is focused on an image plane of the main camera lens instead of at infinity, as in the conventional plenoptic camera. With the focused plenoptic camera, each microcamera is reimaging the main lens image onto the photosensor. The microlenses form an array of true images of the main lens image as a relay system.

The ovoid shaded area in FIGS. 2A and 2B represent the three-dimensional (3D) image formed inside the camera by the main camera lens. Note that this 3D image may extend behind the microlenses. FIG. 2A illustrates the Keplerian telescopic case where the image plane being imaged is in front of the microlenses. If the main lens forms an image behind the microlenses, it is still possible to focus the microlenses on that virtual image so that they form a real image on the photosensor. This is the Galilean telescopic case (see FIG. 2B). In both the Keplerian telescopic case and the Galilean telescopic case, the microlens imaging is described by the lens equation:

$$\frac{1}{a} + \frac{1}{b} = \frac{1}{f}$$

with, respectively, positive a (Keplerian telescopic case) or negative a (Galilean telescopic case). When remapped onto the photosensor, the image of the main lens is reduced in size. This reduction may be denoted as:

$$m = \frac{a}{b}$$

As a result of this scaling, the spatial resolution of the radiance captured by the plenoptic camera is a function of the resolution of the microlens images and the amount of overlap in rendering, and not of the number of microlenses. This decoupling of resolution and number of microlenses is a critical observation that distinguishes the focused plenoptic camera from the conventional plenoptic camera.

Another difference between the conventional plenoptic camera and the focused plenoptic camera is in the nature of the information that is captured by each microlens. In the conventional plenoptic camera, each microlens images one position in the scene, capturing all of the angular information there. In the focused plenoptic camera, different microlenses capture the same position; angular information is spread across microlenses. Accordingly, to render flats captured with the focused plenoptic camera, the rendering algorithm integrates across microlens images, rather than within a single microlens image. That is, assuming that the task is "imaging the image" that is in focus, the rendering algorithm integrates the points in the microlenses that correspond to the same position in the image by overlapping them at a fixed pitch. See U.S. patent application Ser. No. 12/474,112 for examples of basic rendering algorithms for flats captured with embodiments of the focused plenoptic camera.

In order to apply super-resolution techniques to the focused plenoptic camera, the microcamera array needs to be precisely characterized. In particular, the array of microlenses together with the main lens is equivalent to an array of cameras due to the focused plenoptic camera's relay imaging mode of work (see FIGS. 2A and 2B). An array of microcameras observe the "object" in front of them. This "object" is the aerial 3D image of the scene, formed behind the main camera lens, represented as a shaded ovoid in FIGS. 2A and 2B. Since super-resolution is applicable to an array of cameras imaging an object, it is applicable to focused plenoptic camera imaging.

Thin Plenoptic Camera Embodiments

Plenoptic camera technology offers several imaging capabilities that may be desirable in mobile devices, including but not limited to full 3D imaging, refocusabilty, and High Dynamic Range (HDR) imaging. However with everything else equal, the imaging capabilities provided by current plenoptic camera technology come at the expense of 5 to 10 times smaller pixels in plenoptic cameras when compared to conventional non-plenoptic cameras. However, as previously noted, pixels cannot be smaller than the wavelength of light or the diffraction limit of the lens. The task of shrinking any camera reaches a critical limit when pixel sizes approach the wavelength of light. Because of the smaller pixels generally used in plenoptic cameras, these limitations are more severe for the plenoptic camera than for conventional cameras. In reducing the size of the plenoptic camera, the plenoptic camera hits the diffraction limit sooner than a conventional camera. Thus, the plenoptic camera has conventionally been viewed as being too large for small camera applications such as cameras for mobile devices where there is also a desire for sufficiently high resolution to generate visually nice images.

The above results in the need to make the pixels in a plenoptic camera up to 10 times smaller than the wavelength of light (~500 nm) to achieve sufficiently high resolution. This would result in pixels of size 50 nm (nanometers), or alternatively may be achieved with a mask on the pixels with holes of size 50 nm at each (larger) pixel. While not currently available, there are no fundamental constraints in electronics/sensor manufacturing that prohibit pixels that small, nor are there known constraints in mask manufacturing that would prevent masks with holes that small. However, such small pixels are not useful in conventional diffraction-limited optics because pixels need to be bigger than the features in the image (~500 nm). As noted, ~500 nm is the wavelength of light, and is the smallest size of a diffraction-limited spot. In currently available technology, pixels have reached size as small as ~700 nm, and there is a belief that shrinking pixels much further would not be practical due to the above-noted limitations of diffraction-limited optics.

Thin Plenoptic Camera Embodiments Employing Microsphere Technology

A detailed mathematical theory of scattering/refracting electromagnetic waves (light) from a small sphere has existed for some time (~100 years). Solutions of the Maxwell's equations for light waves in the presence of a small sphere (or microsphere) have sharp peaks in the near field, close to the sphere. These peaks are localized at less than the wavelength of light. This technology and theory may allow the resolution of objects down to ~50 nm. These near field solutions were largely overlooked for a long time, perhaps because there have been no devices that can resolve such small features. However, recently, a number of researchers are reporting the use of microspheres for focusing optical microscopes. Some have claimed the resolution of objects as small as ~50 nm using this technique in optical telescopes.

Embodiments of thin (e.g., ~5 mm) plenoptic cameras are described that integrate these microspheres with plenoptic camera technology to overcome the above-noted limitations of diffraction-limited optics, allowing pixel size to be effectively reduced in the cameras, which in turn allows the plenoptic camera's thickness to be reduced to at least ~5 mm, suitable for use in thin mobile devices and other applications. In particular, embodiments of thin plenoptic cameras are described in which the microlenses of a focused plenoptic camera as illustrated in FIGS. 2A and 2B are replaced with microspheres. Example embodiments of these thin plenoptic cameras are illustrated in FIGS. 3 through 6. The reduction in pixel size provided by this technology allows plenoptic cameras to be made much thinner, e.g. up to 10× thinner, than previously possible, while producing high-resolution, sharp output images. In addition, these modified plenoptic cameras may capture full radiance information, allowing plenoptic techniques such as 3D imaging, refocusing, HDR imaging, and so on to be applied to the captured image data.

Figure 3:
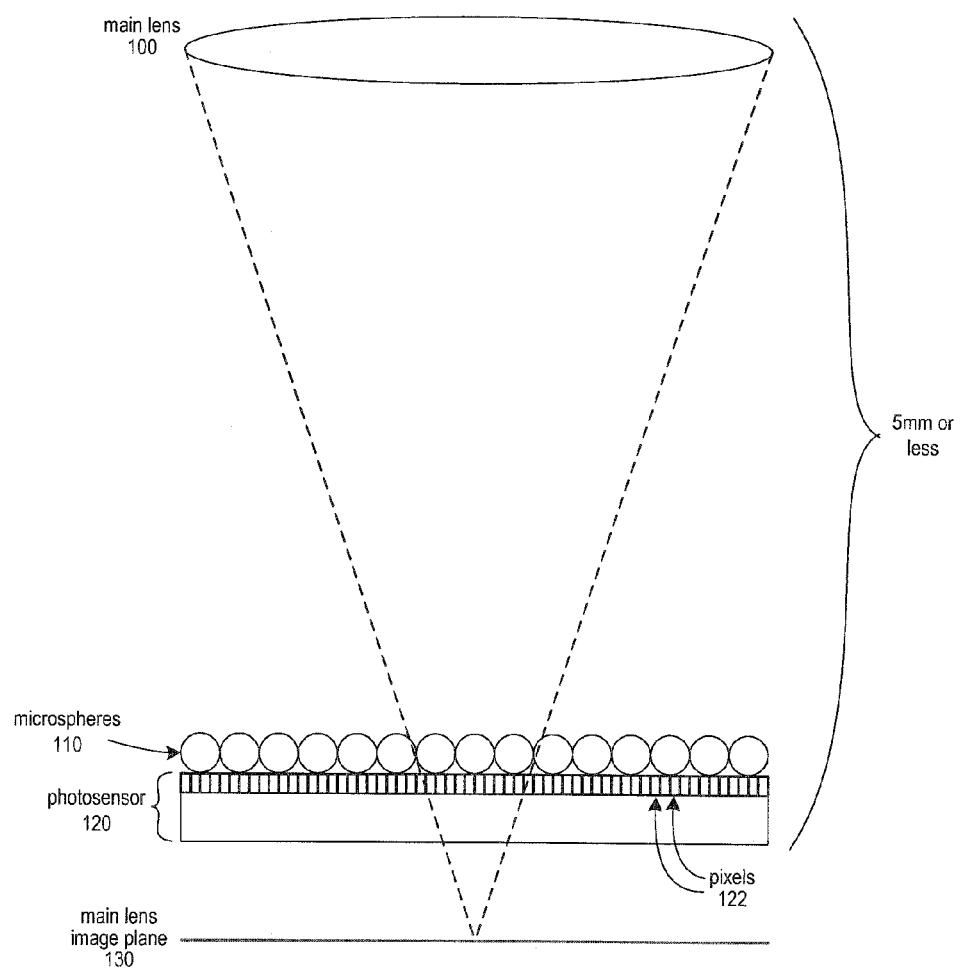
FIG. 3 illustrates an example thin plenoptic camera based on microspheres, according to some embodiments

Embodiments of a thin plenoptic camera may use microspheres of diameter between ~2 and ~10 microns, with a refractive index (n) between ~1.4 and ~2.0, that replace the microlenses in a focused plenoptic camera as illustrated in FIGS. 2A and 2B. These ranges are given by way of example; microspheres of diameter outside the given range and/or with refractive index (n) outside the given range may be used in some embodiments. One example embodiment may use microspheres of diameter 5 microns (5µ), with n=1.8. This example embodiment may have a main lens of aperture around F/2, and the main lens may be focused behind the microspheres (Galilean mode, as shown in FIG. 3). A goal may be to have a magnification factor of around 10, and microimages resolving at ~50 nm (nanometers), or close to that. Note that some embodiments may be configured to operate in Keplerian mode, where the main lens is focused in front of the microspheres.

However, the pixels of the photosensor would need to be as small as 100 nm or even 50 nm. Sensors implementing pixels this small are not currently available, and while such small pixels may be possible, they may be beyond the immediate capabilities of sensor technology. However, components this small are easily within the capabilities of current semiconductor/microchip technology.

To overcome the current lack of sensors that provide pixels as small as would be required with the thin plenoptic cameras as described herein, a mask may be applied to a sensor of current technology that provides larger pixels, and superresolution techniques as described in U.S. patent application Ser. No. 12/690,869, U.S. patent application Ser. No. 12/957,312, and U.S. patent application Ser. No. 12/957,316 may be employed to render captured raw image data. The relatively large pixels of the sensor may be covered with a mask, for example a black chromium mask, that has holes of size under 500 nm, for example ~50 nm, with one hole at each pixel. Note that the size of the holes may be larger or smaller than 50 nm in some embodiments. Since each point is being imaged at nanoscale level by multiple microspheres, the super-resolution techniques as described in U.S. patent application Ser. No. 12/690,869, U.S. patent application Ser. No. 12/957,312 and U.S. patent application Ser. No. 12/957,316 provide methods for reconstructing the whole image at close to 50 nm details. Note that the true image has ~500 nm features, and could be imaged conventionally with a normal camera at a low F-number. However, the ability to image multiple micro-images with focused plenoptic camera technology allows multiple angular views to be resolved at that same 500 nm resolution. Embodiments of the thin plenoptic camera capture radiance, and allow the application of various plenoptic techniques such as 3D imaging, refocusing, HDR, and so on to be applied to the captured image data. Thus, the integration of microspheres with focused plenoptic camera technology allows plenoptic cameras to be reduced in size (thickness) by a factor of up to 10.

FIG. 3 illustrates an example thin plenoptic camera based on microspheres, according to some embodiments. This example thin plenoptic camera may be similar to the focused plenoptic camera illustrated in FIG. 2B; however, the microlens array is replaced by microspheres 110. The microspheres 110 may be attached or fixed to the surface of the photosensor 120 by any of several techniques. For example, a thin layer (e.g., a few nanometers thick) of a transparent adhesive material may be deposited on the pixel surface of the photosensor 120, and the microspheres 110 may be dropped or otherwise deposited on the adhesive layer. The adhesive material may have a low refractive index, much lower than the refractive index of the microspheres 110. As another example, a layer of molten glass or a similar substance may be deposited on the pixel surface of the photosensor 120, and the microspheres 110 may be dropped or otherwise deposited on the layer; once the molten substance cools, the microspheres 110 will be fixed to the surface of the photosensor 120. The substance, once cooled, may have a low refractive index, much lower than the refractive index of the microspheres 110. As another example, the microspheres 110 may be embedded in a substance, such as a plastic or glass, with a much lower refractive index than the microspheres. The substance may form a layer that is very flat on top, while covering the microspheres 110. As another example, the microspheres 110 may be dropped or otherwise placed on the pixel surface of the photosensor 120, and a thin glass (or similar substance) sheet may be placed on top of the microspheres 110 to hold the microspheres 110 against the surface. Again, the substance may have a lower refractive index than the microspheres. These methods are given by way of example; other methods, or combinations of methods, may be used to affix the microspheres 110 to the photosensor 120.

In some embodiments, the microspheres 110 may be randomly placed or deposited on the surface of the photosensor 120, for example by simply dropping the microspheres 110 onto the photosensor 120. In other embodiments, the microspheres 110 may be regularly arranged on the surface of the photosensor 120. In some embodiments, there may be one microsphere 110 per pixel 122. In other embodiments, each microsphere 110 may cover two or more pixels 122. In the example shown in FIG. 3, each microsphere 110 is shown as covering four pixels 122. However, note that the photosensor is two-dimensional, so each microsphere 110 actually corresponds to a square containing 16 pixels 122. Also note that this is just an example, and is not intended to be limiting.

Embodiments of a thin plenoptic camera as illustrated in FIG. 3 may use microspheres of diameter between ~2 and ~10 microns, with refractive index (n) between ~1.4 and ~2.0. The diameter of the main lens 100 may be between ~2 mm (millimeters) and ~3 mm, with aperture within a range of F/1 to ~F/3. These ranges are given by way of example, and are not intended to be limiting. Microspheres 110 of diameters outside the given range and/or with n outside the given range may be used in some embodiments. Main lenses 100 with larger or smaller diameters, and with apertures outside the given range, may be used in some embodiments.

Figure 4:
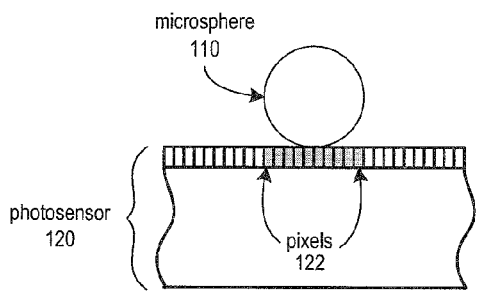
FIG. 4 illustrates an example thin plenoptic camera based on microspheres that employs small pixels, according to some embodiments.
Figure 5:
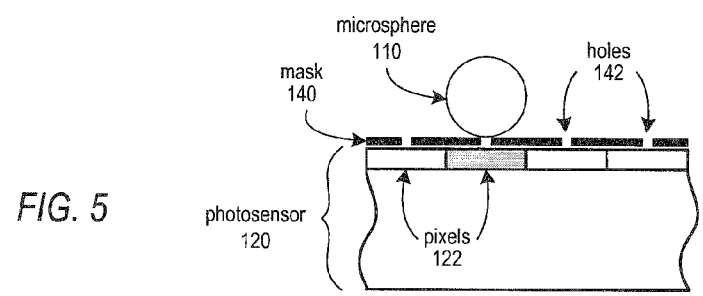
FIG. 5 illustrates an example thin plenoptic camera based on microspheres that employs larger pixels and a mask with small holes, according to some embodiments.
Figure 6:
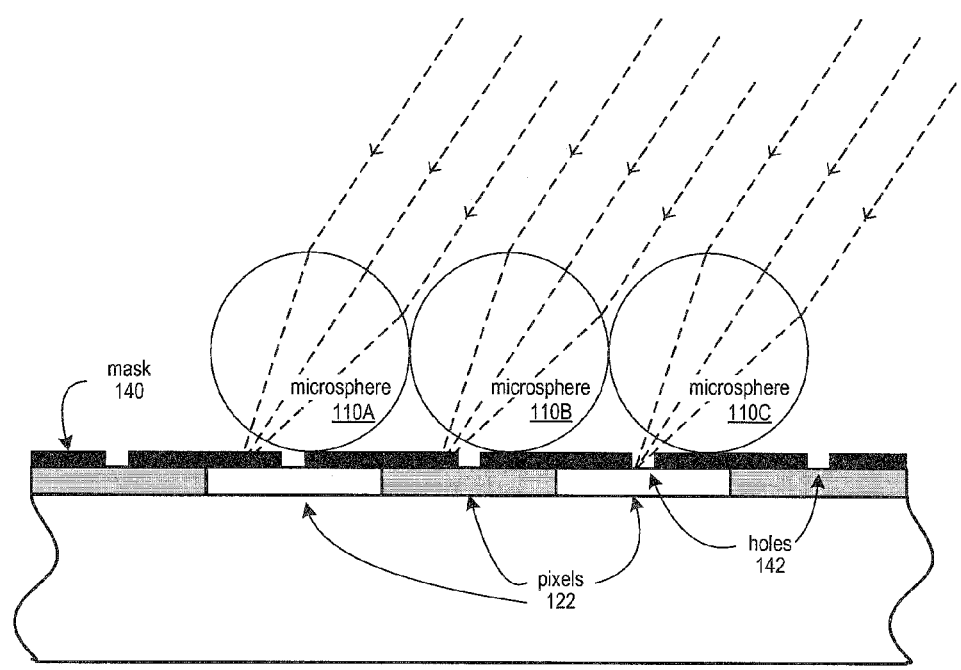
FIG. 6 illustrates that, in the thin plenoptic camera embodiment as illustrated in FIG. 5, only one pixel may capture a far away point that is illuminating the photosensor surface.

FIG. 3 illustrates an example thin plenoptic camera that uses relatively small pixels 122, as illustrated in FIG. 4. In some embodiments, larger pixels 122 may be used, as illustrated in FIGS. 5 and 6. The larger pixels of the sensor may be covered with a mask, for example a black chromium mask, that has holes of size ~50 nm, with one hole at each pixel. Note that the size of the holes may be larger or smaller than 50 nm in some embodiments. The holes 142 may be, but are not necessarily, substantially square or substantially circular, and may be, but are not necessarily, centered on the respective pixels 122. In some embodiments, the diameter of the microspheres 110 may be approximately the same as the width of the pixels 122, with a microsphere 110 centered on each pixel 122. Alternatively, the diameter of the microspheres 110 may be larger or smaller than the width of the pixels 122. FIG. 5 shows an example where the microsphere 110 is of approximately the same diameter as the width of the pixel 122 and is centered over the hole 142 corresponding to the pixel 122. FIG. 6 shows an example where the microspheres 110 are larger than the pixels 122, and are not necessarily centered on the pixels 122.

With appropriately selected and arranged components, a thin plenoptic camera as illustrated in FIGS. 3 through 6 may be approximately 5 mm (millimeters) thin, or even thinner, and thus suitable for use in thin mobile devices. While very thin, the thin plenoptic camera may leverage plenoptic camera technology and super-resolution rendering techniques as described in U.S. patent application Ser. No. 12/690,869, U.S. patent application Ser. No. 12/957,312, and U.S. patent application Ser. No. 12/957,316 to generate sharp output images of higher quality and of higher resolution than possible with conventional methods. In addition, the thin plenoptic camera captures radiance, allowing various plenoptic techniques such as 3D imaging, refocusing, HDR imaging, and so on to be applied to the captured image data.

FIG. 4 illustrates components of an example thin plenoptic camera embodiment, according to some embodiments. This example thin plenoptic camera embodiment employs a sensor technology with small pixels 122 (e.g., smaller than ~500 nm, the wavelength of light). For example, pixels 122 within the range of ~50 nm to ~100 nm may be used in some embodiments, although even smaller or larger pixels 122 may be used in some embodiments. While photosensors 120 with such small pixels 122 may not be currently available, there are no fundamental constraints in electronics/sensor manufacturing that would prohibit the implementation of pixels 122 this small. In these embodiments, each microsphere 110 projects a microimage of a scene onto a region of the photosensor 120 including multiple pixels 122. Super-resolution techniques as described in U.S. patent application Ser. No. 12/690,869, U.S. patent application Ser. No. 12/957,312, and U.S. patent application Ser. No. 12/957,316 may be employed to render the captured raw image data.

FIG. 5 illustrates components of an example thin plenoptic camera embodiment, according to some embodiments. In this example embodiment, a thin plenoptic camera employs a sensor technology with relatively large pixels. The photosensor 120 may be covered with a mask 140, for example a black chromium mask, that includes holes 140 through the mask 140. The holes 140 may be substantially square holes of dimension ~50 nm×~50 nm, or alternatively may be substantially circular holes with diameter of ~50 nm, with one hole at each pixel 122. Note that holes with larger or smaller dimensions may be used. The holes 142 may be, but are not necessarily, centered on the respective pixels 122. In some embodiments, the diameter of the microspheres 110 may be approximately the same as the width of the pixels 122, with a microsphere 110 centered on each pixel 122. Alternatively, the diameter of the microspheres 110 may be larger or smaller than the width of the pixels 122. In these embodiments, super-resolution techniques as described in U.S. patent application Ser. No. 12/690,869, U.S. patent application Ser. No. 12/957,312, and U.S. patent application Ser. No. 12/957,316 may be employed to render the captured raw image data.

FIG. 6 illustrates that, in the thin plenoptic camera embodiment as illustrated in FIG. 5, only one pixel may capture a far away point that is illuminating the photosensor surface. FIG. 6 shows a portion of a photosensor, with multiple pixels 122 covered by a mask 140 that includes a hole 142 at each pixel. The dashed lines represent light coming from a particular point that is essentially at infinity, and thus the rays are parallel. The light rays are affected by microsphere 110C so that the rays hit the corresponding pixel 122 through a hole 142 in the mask 140. However, the light rays passing through microspheres 110A and 110B hit opaque portions of the mask 140, and do not pass through any of the holes 142 in mask 140. Note that light rays coming from different points at infinity may be similarly affected by microspheres 110A or 110B so that the rays hit a corresponding pixel 122 through a hole 142 in the mask 140, but hit opaque portions of the mask 140 when passing through the other microspheres.

Thin Plenoptic Camera Embodiments Employing Solid Immersion Lens (SIL) Technology Solid immersion lenses (SILs) are a technology that provides higher magnification and higher numerical aperture than can be achieved with conventional lenses. SIL technology leverages the fact that, when light passes through a material, the wavelength of the light is reduced proportional to the refractive index (n) of the material. A solid immersion lens (SIL) is composed of a high-refractive-index material. The refractive index (n) of the material used may, for example, be within a range of ~1.5 to ~4, although new materials may be developed that may provide higher refractive indexes. There are currently two types of SILs: hemispherical SILs (½ of a sphere; height=radius r) and "superhemispherical" SILs. Hemispherical SIL technology may increase the numerical aperture by n, the refractive index of the material of the lens. For superhemispherical SILs, the height of the truncated sphere is $(1+1/n)$ r. Superhemispherical SIL technology may increase the numerical aperture by $n^2$.

Embodiments of thin (e.g., ~5 mm to ~3 mm or less) cameras are described that integrate these SILs with plenoptic camera technology (e.g., super-resolution techniques developed for rendering images from flats captured with focused plenoptic camera technology) to overcome the above-noted limitations of diffraction-limited optics, allowing pixel size to be effectively reduced in the cameras, which in turn allows the cameras' thickness to be reduced to at least ~3 mm, suitable for use in thin mobile devices and other applications. In addition to SIL technology, these thin plenoptic cameras may also use an array of multiple lenses, or microlenses, as main camera lenses instead of a single lens as in conventional cameras. These thin plenoptic cameras may also employ color filters to reduce aberrations introduced by the lenses, improving focus. Example embodiments of such thin plenoptic cameras are illustrated in FIGS. 7 through 10. Thus, the reduction in pixel size provided by this technology allows these cameras to be made much thinner than previously possible, while producing high-resolution, sharp output images.

An example thin plenoptic camera employing this technology may include multiple main lenses, each lens with an aperture of ~2 mm to ~3 mm. Lenses with smaller or larger apertures may be used in some embodiments. Each main lens may, but does not necessarily, have an associated color filter that may be used to reduce chromatic aberrations, and that may allow the use of less expensive optics. Each main lens may effectively act as a separate camera. A sensor with relatively large pixels of about 1-2 microns may be used. The relatively large pixels of the sensor may be covered with a mask, for example a black chromium mask, that includes holes of size 50 nm, with one hole at each pixel. Multiple SILs may be placed on the mask, between the mask/sensor and the main lenses. Note that the refractive index n depends on the wavelength of light. Since the camera may use color filters, this means that the SILs may be of different radiuses, or of different heights, according to the corresponding color filters. In other words, the SILs that are used may be selected and adjusted to account for the respective color filters.

Super-resolution techniques as described in U.S. patent application Ser. No. 12/690,869, U.S. patent application Ser. No. 12/957,312, and U.S. patent application Ser. No. 12/957,316 may be applied to the image data captured with the thin plenoptic camera. The photosensor captures multiple microimages, each microimage corresponding to a different main lens. The microimages may be super-resolved and appropriately combined to render a high resolution final image, with color and with all gaps between the pixels filled in from neighboring microimages in a redundant way (e.g., for noise reduction). At close to F/1, this would allow the camera to be ~3 mm thick or less. Super-resolution techniques that may be used are described in U.S. patent application Ser. No. 12/690,869, U.S. patent application Ser. No. 12/957,312, and U.S. patent application Ser. No. 12/957,316, all of which were previously incorporated by reference in their entirety.

Figure 7:
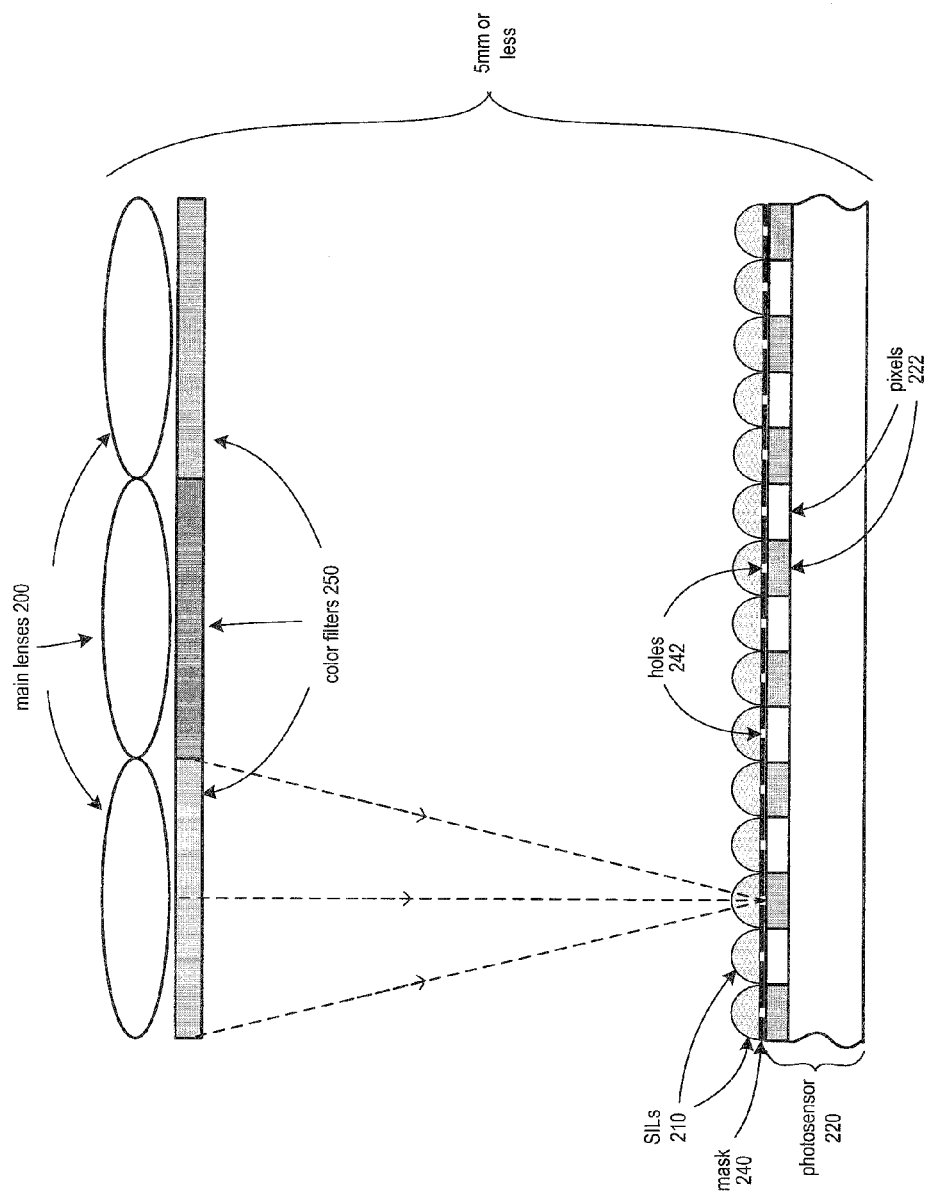
FIG. 7 illustrates an example thin plenoptic camera that employs solid immersion lens (SIL) technology, in this example hemispherical SIL technology, along with multiple main lenses and a mask on the photosensor.

FIG. 7 illustrates an example thin plenoptic camera embodiment that employs solid immersion lens (SIL) technology, in this example embodiment hemispherical SIL technology, along with multiple main lenses and a mask on the photosensor, to substantially reduce the size (specifically, thickness) of the camera to ~3 mm or less. The camera may include multiple main lenses 200 arranged in an objective lens array, each lens with an aperture of ~2 mm to ~3 mm. Lenses 200 with smaller or larger apertures may be used in some embodiments. Each lens 200 may have an associated color filter 250; the color filters 250 may be used to reduce chromatic aberrations, and may thus allow the use of less expensive optics. Each main lens 200 may effectively act as a separate camera. Note that the objective lens array is arranged so that the lenses 200 are arranged perpendicular to an optical axis of the camera.

The pixels 222 of the sensor 220 may be covered with a mask 240, for example a black chromium mask, that has holes 242 of size ~50 nm, with one hole at each pixel. Note that the size of the holes 242 may be larger or smaller than 50 nm in some embodiments. The holes 242 may be, but are not necessarily, substantially square or substantially circular, and may be, but are not necessarily, centered on the respective pixels 222. SILs 210 may be affixed or attached to the masked surface of the photosensor 220. Similar methods to those previously described for attaching microspheres to a photosensor may be employed to attach the SILs 210 to the photosensor 220, or other methods may be used. In some embodiments, the SILs 210 may have a diameter of approximately 1.5 microns, although larger or smaller SILs 210 may be used in some embodiments. In some embodiments, the diameter of the SILs 210 may be approximately the same as the width of the pixels 222, with an SIL 210 centered on each pixel 222. Alternatively, the diameter of the SILs 210 may be larger or smaller than the width of the pixels 222. Note that the refractive index n depends on the wavelength of light. Since the camera may use different color filters 250, this means that the SILs 210 that are used may be of different radiuses, or of different heights, according to the corresponding color filters 250. In other words, the SILs that are used may be selected and adjusted to account for the respective color filters 250.

In these embodiments, each main lens 250 projects a microimage of a scene onto a region of the photosensor 220 including multiple pixels 222. Super-resolution techniques as described in U.S. patent application Ser. No. 12/690,869, U.S. patent application Ser. No. 12/957,312, and U.S. patent application Ser. No. 12/957,316 may be employed to render sharp, high-resolution images from the captured raw image data.

With appropriately selected and arranged components, a thin plenoptic camera as illustrated in FIG. 7 may be approximately 3 mm (millimeters) thin, or even thinner, and thus suitable for use in thin mobile devices. While very thin, the thin plenoptic camera may leverage plenoptic camera technology and super-resolution rendering techniques as described in U.S. patent application Ser. No. 12/690,869, U.S. patent application Ser. No. 12/957,312, and U.S. patent application Ser. No. 12/957,316 to generate sharp output images of higher quality and of higher resolution than possible with conventional methods.

Figure 8:
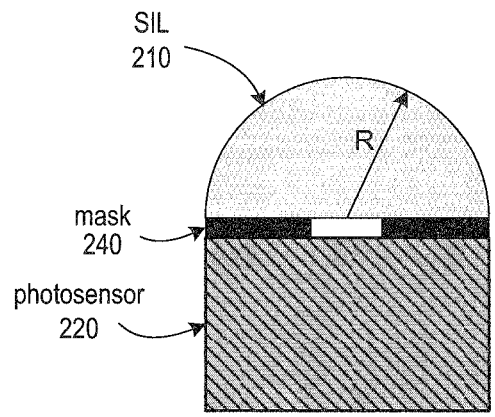
FIG. 8 shows a close-up of one of the hemispherical SIL elements as illustrated in the thin plenoptic camera of FIG. 7, according to some embodiments.

FIG. 8 shows a close-up of one of the hemispherical SIL elements as illustrated in the example thin plenoptic camera of FIG. 7, according to some embodiments. In this example, the SIL 210 has a radius R. The refractive index of the material of which the SIL 210 is composed may be ~1.5 or higher. When light passes through the SIL 210, the wavelength of the light is reduced proportional to the refractive index (n) of the material. The light striking SIL 210 is essentially "reduced" to the size of a hole in mask 240, thus reducing pixel size proportional to the refractive index of the material. The small pixels may be captured by photosensor 220; super-resolution techniques as described in U.S. patent application Ser. No. 12/690,869, U.S. patent application Ser. No. 12/957,312, and U.S. patent application Ser. No. 12/957,316 may be employed to raw image data captured using this thin plenoptic camera to render sharp, high-resolution images from the captured raw image data.

Figure 9:
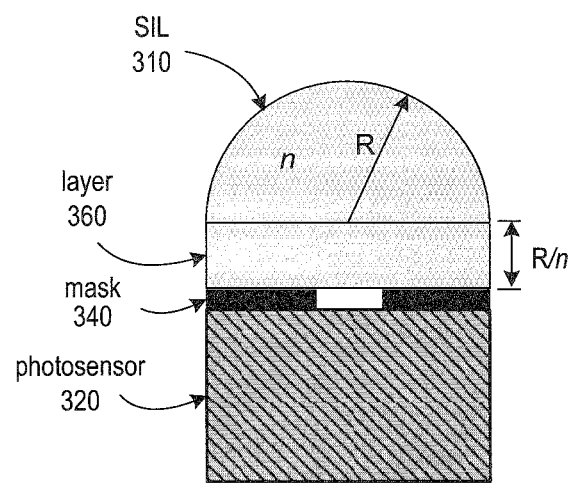
FIG. 9 illustrates an embodiment of a thin plenoptic camera that includes a layer between hemispherical SILs and the photosensor that effectively implements superhemispherical SIL technology in the camera.

While the thin plenoptic camera embodiments as illustrated in FIGS. 7 and 8 employ hemispherical SILs, embodiments may be implemented that instead use superhemispherical SILs. However, superhemispherical SILs may pose problems for practical implementations. Therefore, embodiments of a thin plenoptic camera are described that employ a layer composed of the same material, and with substantially the same refractive index, as the hemispherical SILs. The layer is positioned between the hemispherical SILs and the mask on the photosensor, and is of the thickness R/n, where R is the radius of the SIL and n is the refractive index of the material used in the SIL and the layer. This layer may be used in combination with the hemispherical SILs to provide optical characteristics substantially similar to those of superhemispherical SILs. FIG. 9 illustrates components of an embodiment of a thin plenoptic camera that includes a layer between hemispherical SILs and the photosensor that effectively implements superhemispherical SIL technology in the camera, which may allow even smaller pixels to provide even further reduction in thickness of the camera and/or higher resolution imaging. In FIG. 9, layer 360 may be composed of a material with substantially the same refractive index (n) as the SIL 310. The thickness of layer 360 is R/n, where R is the radius of the SIL 310, and n is the refractive index of layer 360 and SIL 310. In this embodiment, each SIL 310 may correspond to one pixel 322. The refractive index of the material of which the SIL 310 and layer 360 are composed may be ~1.5 or higher. When light passes through the SIL 310 and layer 360, the wavelength of the light may be reduced proportional to the square of the refractive index (n) of the material. The light striking SIL 310 is essentially "reduced" to the size of a hole in mask 340, thus reducing pixel size proportional to the square of the refractive index of the material. The small pixels may be captured by photosensor 320; super-resolution techniques as described in U.S. patent application Ser. No. 12/690,869, U.S. patent application Ser. No. 12/957,312, and U.S. patent application Ser. No. 12/957,316 may be employed to render sharp, high-resolution images from the captured raw image data.

Figure 10:
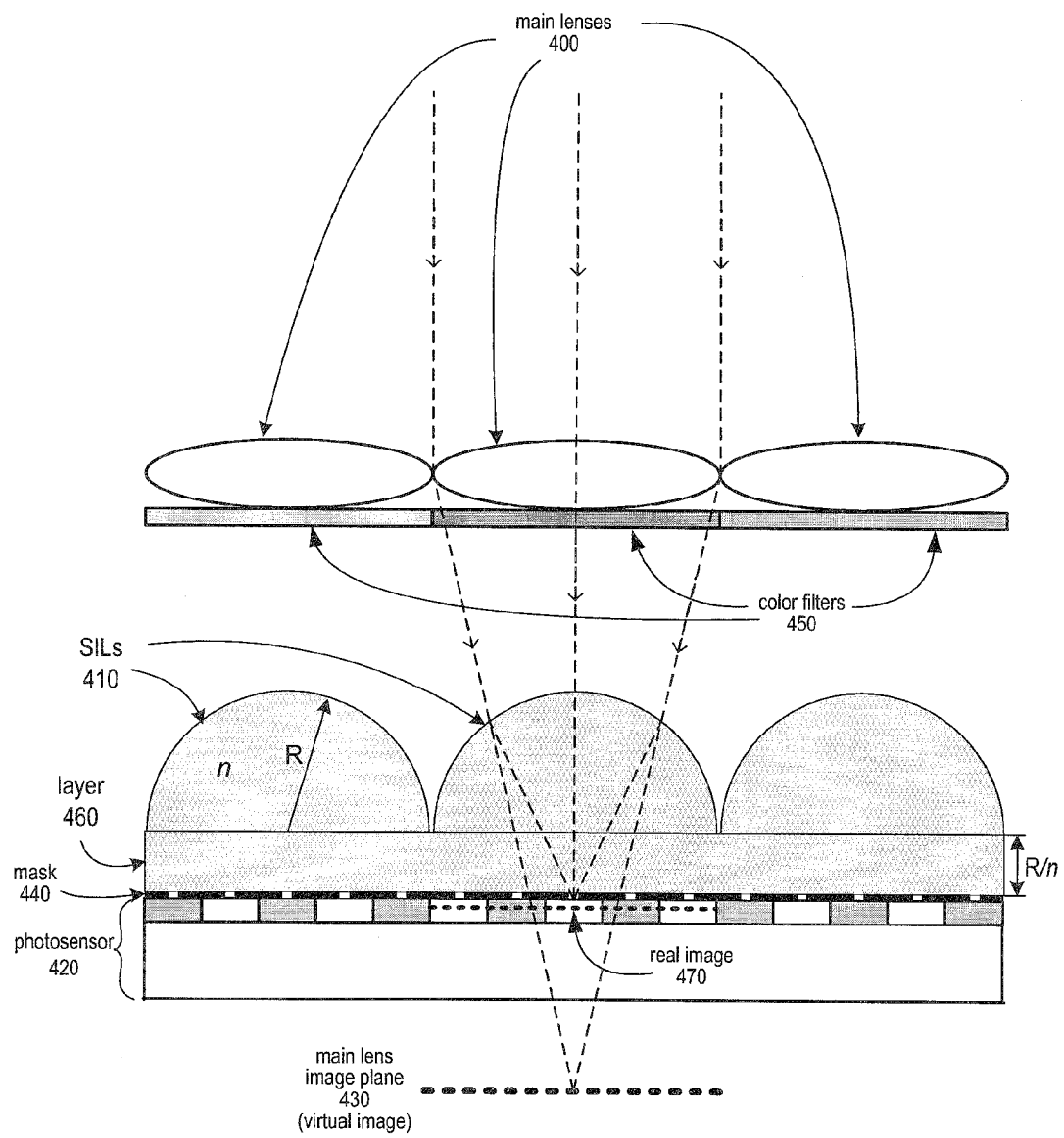
FIG. 10 illustrates another embodiment of a thin plenoptic camera that includes a layer between hemispherical SILs and the photosensor that effectively implements superhemispherical SIL technology in the camera.

FIG. 10 illustrates another embodiment of a thin plenoptic camera that includes a layer between hemispherical SILs and the photosensor that effectively implements superhemispherical SIL technology in the camera. The camera may include multiple main lenses 400. Each main lens may have an associated color filter 450; the color filters may be used to reduce chromatic aberrations, and may thus allow the use of less expensive optics. In this embodiment, each SIL 410 may correspond to one main lens 400, while each SIL 410 may correspond to many pixels 422, even millions of pixels. For example, in one example embodiment, the main lenses 400 may be composed as a 3×3 main lens array that includes nine main lenses 400, and there may be a corresponding array of nine SILs 410. In this example, the main lenses 400 may be focused at main lens image plane 430 behind the SILs 410 and layer 460 (Galilean mode); however, note that the real image 470 that is captured is formed at photosensor 420. Note that the array of main lenses 400 with filters 450 may be physically closer to or farther from the SILs 410 than depicted. Also note that the arrays may be of different dimensions (e.g. 2×2, 3×2, 4×3, etc.) or may be one-dimensional arrays (e.g., 1×3, 1×4, etc).

Note that the refractive index n depends on the wavelength of light. Since the camera may use different color filters 450, this means that the SILs 410 that are used may be of different radiuses, or of different heights, according to the corresponding color filters 450. In other words, the SILs that are used may be selected and adjusted to account for the respective color filters 450.

As in FIG. 9, layer 460 is composed of a material with substantially the same refractive index (n) as the SILs 410. The thickness of layer 460 is R/n, where R is the radius of the SILs 410. The SILs 410 and layer 460 may affect light similarly to the SILs and layer as described in FIG. 9. However, each main lens 400 (with respective filter 450) and SIL 410 (with layer 460) effectively forms a separate camera that projects a large microimage composed of many small pixels onto photosensor 420. Super-resolution techniques as described in U.S. patent application Ser. No. 12/690,869, U.S. patent application Ser. No. 12/957,312, and U.S. patent application Ser. No. 12/957,316 may be employed to render sharp, high-resolution images from the captured raw image data.

Imaging and Rendering with Embodiments of a Thin Plenoptic Camera

Figure 11A:
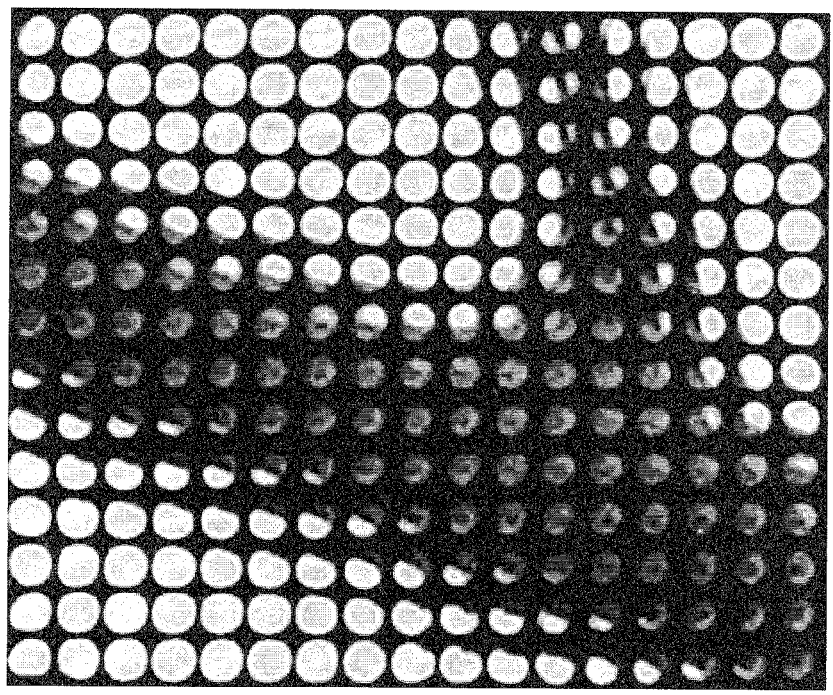
FIG. 11A shows a zoom-in to a portion of example raw image data (referred to herein as a flat) as may be captured with an embodiment of one of the thin plenoptic cameras as described herein.

FIG. 11A shows a zoom-in to a portion of example raw image data (referred to herein as a flat) as may be captured with an embodiment of one of the thin plenoptic cameras as described herein. Note that these example microimages are substantially circular. The captured flat, or raw image data, may be rendered according to a super-resolution rendering technique, for example one of the techniques as described in U.S. patent application Ser. No. 12/690,869, U.S. patent application Ser. No. 12/957,312, and U.S. patent application Ser. No. 12/957,316, to produce a final high-resolution, sharp image.

Figure 11B:
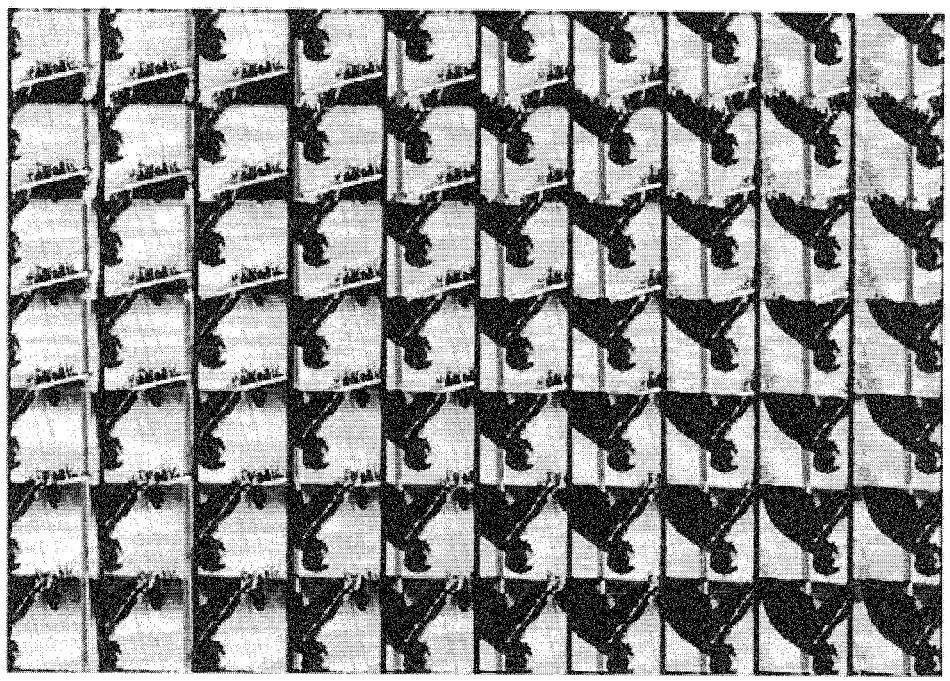
FIG. 11B shows a zoom-in to a portion of another example flat as may be captured with an embodiment of one of the thin plenoptic cameras as described herein.

FIG. 11B shows a zoom-in to a portion of another example flat as may be captured with an embodiment of one of the thin plenoptic cameras as described herein. Note that a square main lens aperture was used on the camera to provide efficient use of photosensor space, so the microimages are squares and not circles. The captured flat, or raw image data, may be rendered according to a super-resolution rendering technique, for example one of the techniques as described in U.S. patent application Ser. No. 12/690,869, U.S. patent application Ser. No. 12/957,312, and U.S. patent application Ser. No. 12/957,316, to produce a final high-resolution, sharp image.

Figure 12:
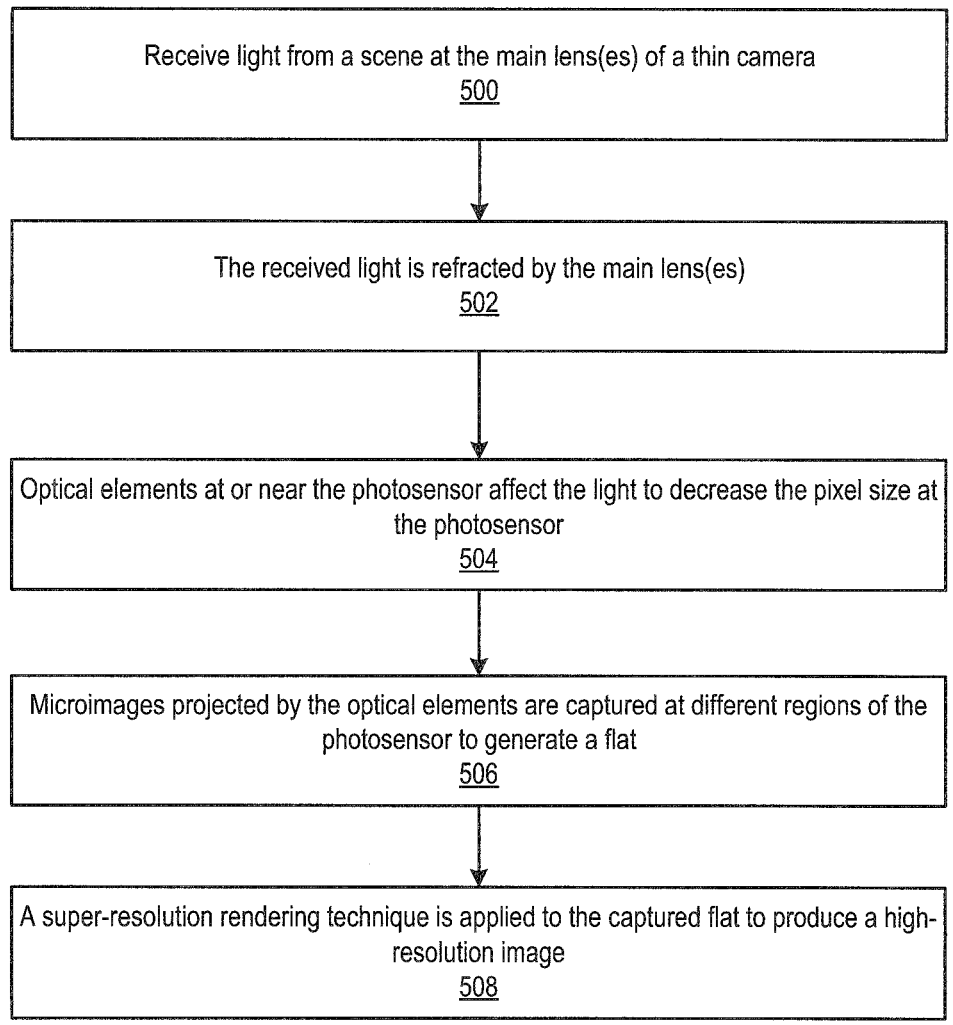
FIG. 12 is a flow chart that illustrates imaging and rendering with a camera that implements technology as described herein to reduce pixel size to below the wavelength of light, enabling thin plenoptic cameras that can produce high-resolution, sharp images, according to at least some embodiments.

FIG. 12 is a flow chart that illustrates imaging and rendering with a camera that implements technology as described herein to reduce pixel size to below the wavelength of light, enabling thin plenoptic cameras that can produce high-resolution, sharp images, according to at least some embodiments. As indicated at 500, light from a scene is received at the main lens(es) of a thin plenoptic camera as described herein, for example one of the thin plenoptic camera embodiments as illustrated in FIGS. 3 through 10. In some embodiments, the main lens may be a single lens; in other embodiments, the main lens may be an array of two or more objective lenses or microlenses. As indicated at 502, the received light is refracted by the main lens towards a photosensor. In some embodiments, the light may pass through color filters at each lens of the main lens array to reduce aberrations. In some embodiments, the main lens may form an image plane either in front of optical elements that are proximate to the photosensor (Keplerian mode) or behind the photosensor (Galilean mode). As indicated at 504, optical elements at or near the photosensor affect the light to decrease the pixel size at the photosensor. For example, the pixel size may be reduced to within a range of ~50 nm (nanometers) to ~100 nm. Example optical elements that may be used may include one or more of microspheres, solid immersion lenses (SILs) (either hemispherical or superhemispherical SILs), a layer of material used in combination with hemispherical SILs and composed of material with substantially the same refractive index as the SILs in order to provide optical characteristics substantially similar to those of superhemispherical SILs, and a mask with small holes (e.g., ~50 nm to ~100 nm holes) at each pixel of the photosensor that may be used with either microspheres or SILs, as illustrated in FIGS. 3 through 10. As indicated at 506, microimages projected by the optical elements of the camera onto the photosensor are captured at different regions of the photosensor to generate a flat. At 508, the captured flat, or raw image data, may be rendered according to a super-resolution rendering technique, for example one of the techniques as described in U.S. patent application Ser. No. 12/690,869, U.S. patent application Ser. No. 12/957,312, and U.S. patent application Ser. No. 12/957,316, to produce a final high-resolution, sharp image.

Figure 13:
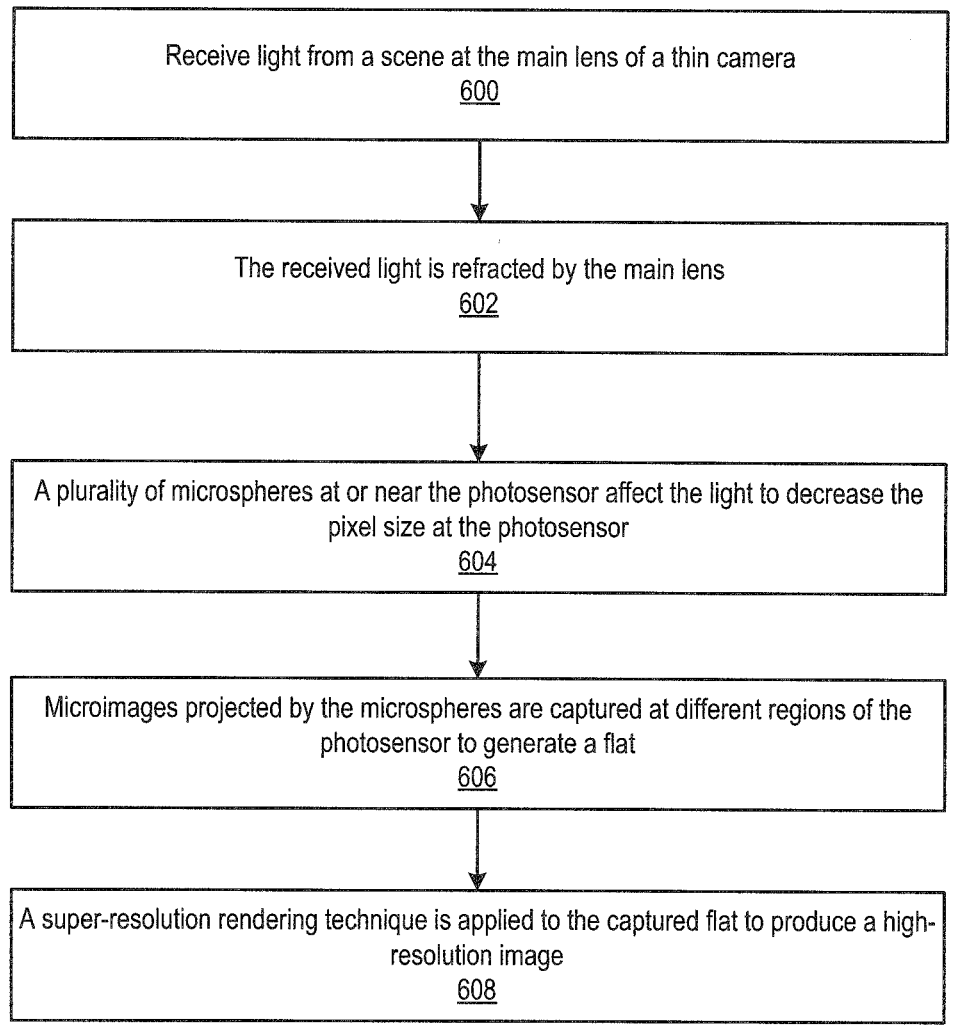
FIG. 13 is a flow chart that illustrates imaging and rendering with a camera that implements microsphere technology as described herein to reduce pixel size to below the wavelength of light, enabling thin plenoptic cameras that can produce high-resolution, sharp images, according to at least some embodiments.

FIG. 13 is a flow chart that illustrates imaging and rendering with a camera that implements microsphere technology as described herein to reduce pixel size to below the wavelength of light, enabling thin plenoptic cameras that can produce high-resolution, sharp images, according to at least some embodiments. As indicated at 600, light from a scene is received at the main lens of a thin plenoptic camera as described herein, for example one of the thin plenoptic camera embodiments as illustrated in FIGS. 3 through 6. As indicated at 602, the received light is refracted by the main lens towards a photosensor. In embodiments, the main lens may form an image plane either in front of optical elements that are proximate to the photosensor (Keplerian mode) or behind the photosensor (Galilean mode). As indicated at 604, microspheres at or near the photosensor affect the light to decrease the pixel size at the photosensor. For example, the pixel size may be reduced to within a range of ~50 nm (nanometers) to ~100 nm. In at least some embodiments, a mask with small holes (e.g., ~50 nm to ~100 nm holes) at each pixel of the photosensor may be used with the microspheres, as illustrated in FIGS. 5 and 6. As indicated at 606, microimages projected by the optical elements of the camera onto the photosensor are captured at different regions of the photosensor to generate a flat. At 608, the captured flat, or raw image data, may be rendered according to a super-resolution rendering technique, for example one of the techniques as described in U.S. patent application Ser. No. 12/690,869, U.S. patent application Ser. No. 12/957,312, and U.S. patent application Ser. No. 12/957,316, to produce a final high-resolution, sharp image.

Figure 14:
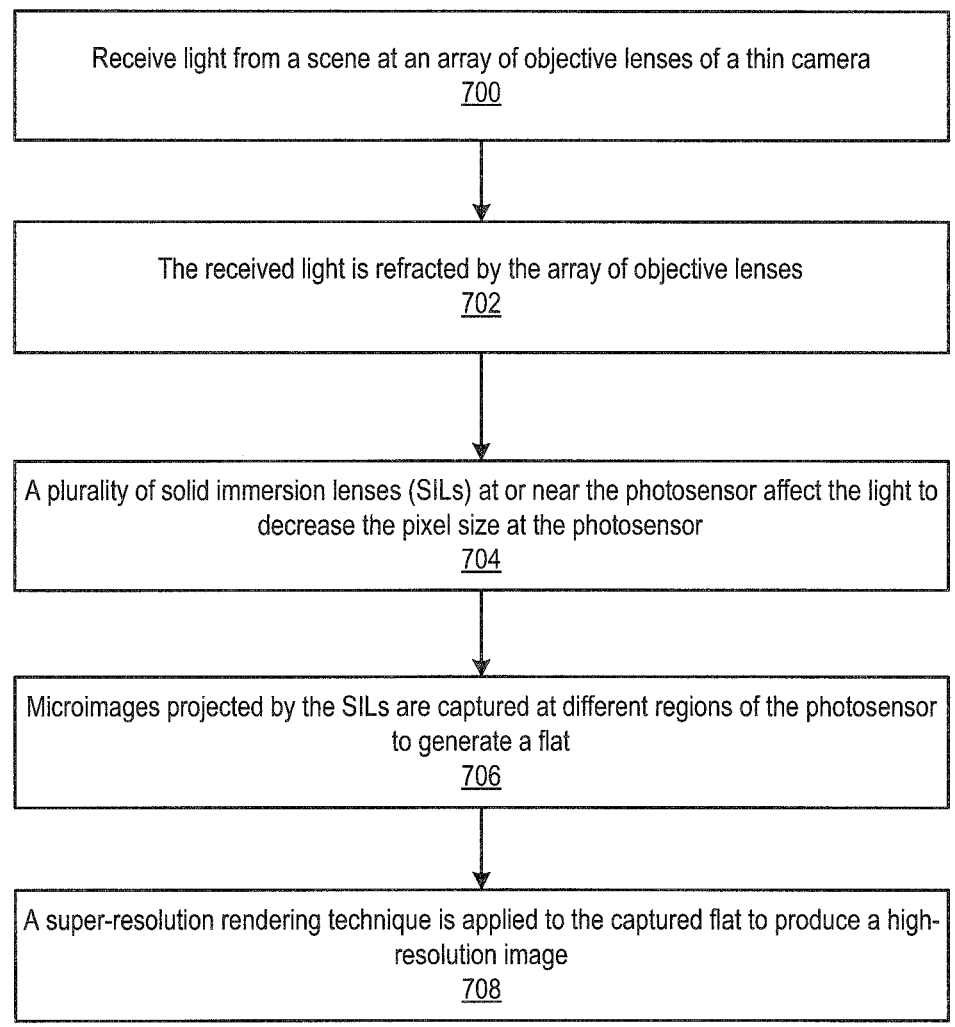
FIG. 14 is a flow chart that illustrates imaging and rendering with a camera that implements solid immersion lens (SIL) technology as described herein to reduce pixel size to below the wavelength of light, enabling thin plenoptic cameras that can produce high-resolution, sharp images, according to at least some embodiments.

FIG. 14 is a flow chart that illustrates imaging and rendering with a camera that implements solid immersion lens (SIL) technology as described herein to reduce pixel size to below the wavelength of light, enabling thin plenoptic cameras that can produce high-resolution, sharp images, according to at least some embodiments. As indicated at 700, light from a scene is received at the main lens of a thin plenoptic camera as described herein, for example one of the thin plenoptic camera embodiments as illustrated in FIGS. 7 through 10. In at least some embodiments, the main lens may be an array of two or more objective lenses or microlenses. As indicated at 702, the received light is refracted by the main lens towards a photosensor. In some embodiments, the light may pass through color filters at each objective lens of the main lens array to reduce aberrations. In some embodiments, the main lens may form an image plane either in front of optical elements that are proximate to the photosensor (Keplerian mode) or behind the photosensor (Galilean mode). As indicated at 704, the SILs located at or near the photosensor affect the light to decrease the pixel size at the photosensor. For example, the pixel size may be reduced to within a range of ~50 nm (nanometers) to ~100 nm. The solid immersion lenses (SILs) may be either hemispherical (see, e.g., FIGS. 7 and 8) or superhemispherical SILs. In some embodiments, for example as illustrated in FIGS. 9 and 10, a layer of material may be used in combination with hemispherical SILs; the layer may be composed of material with substantially the same refractive index as the SILs. This combination of the layer with the hemispherical SILs may act to provide optical characteristics substantially similar to those of superhemispherical SILs. In some embodiments, a mask with small holes (e.g., ~50 nm to ~100 nm holes) at each pixel of the photosensor may be used with the SILs, as illustrated in FIGS. 7 through 10. As indicated at 706, microimages projected by the optical elements of the camera onto the photosensor are captured at different regions of the photosensor to generate a flat. At 708, the captured flat, or raw image data, may be rendered according to a super-resolution rendering technique, for example one of the techniques as described in U.S. patent application Ser. No. 12/690,869, U.S. patent application Ser. No. 12/957,312, and U.S. patent application Ser. No. 12/957,316, to produce a final high-resolution, sharp image.

Example Implementations of Rendering Techniques

Figure 15:
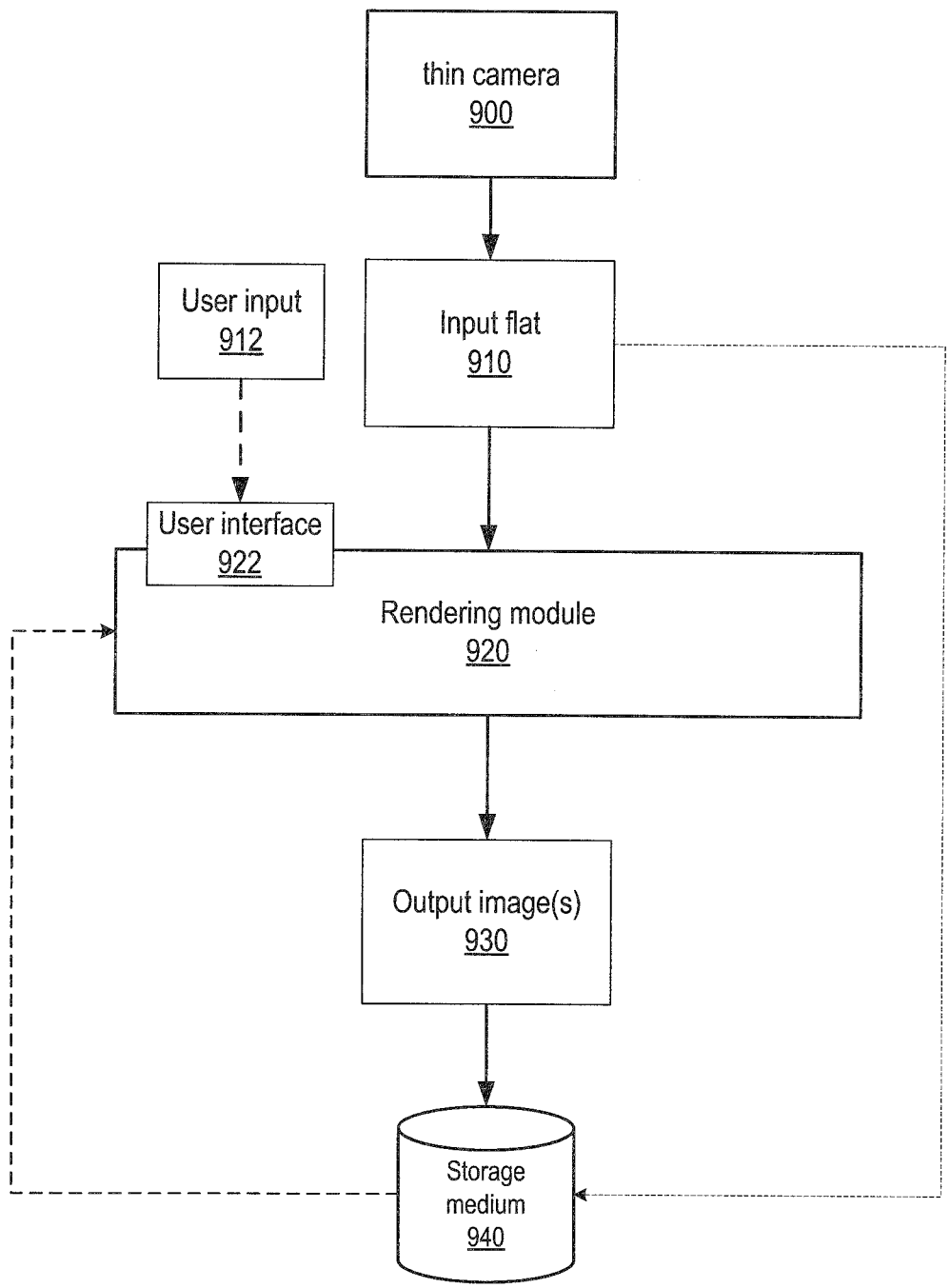
FIG. 15 illustrates a rendering module rendering images from a flat captured, for example, by one of the various embodiments of a thin plenoptic camera as described herein.
Figure 16:
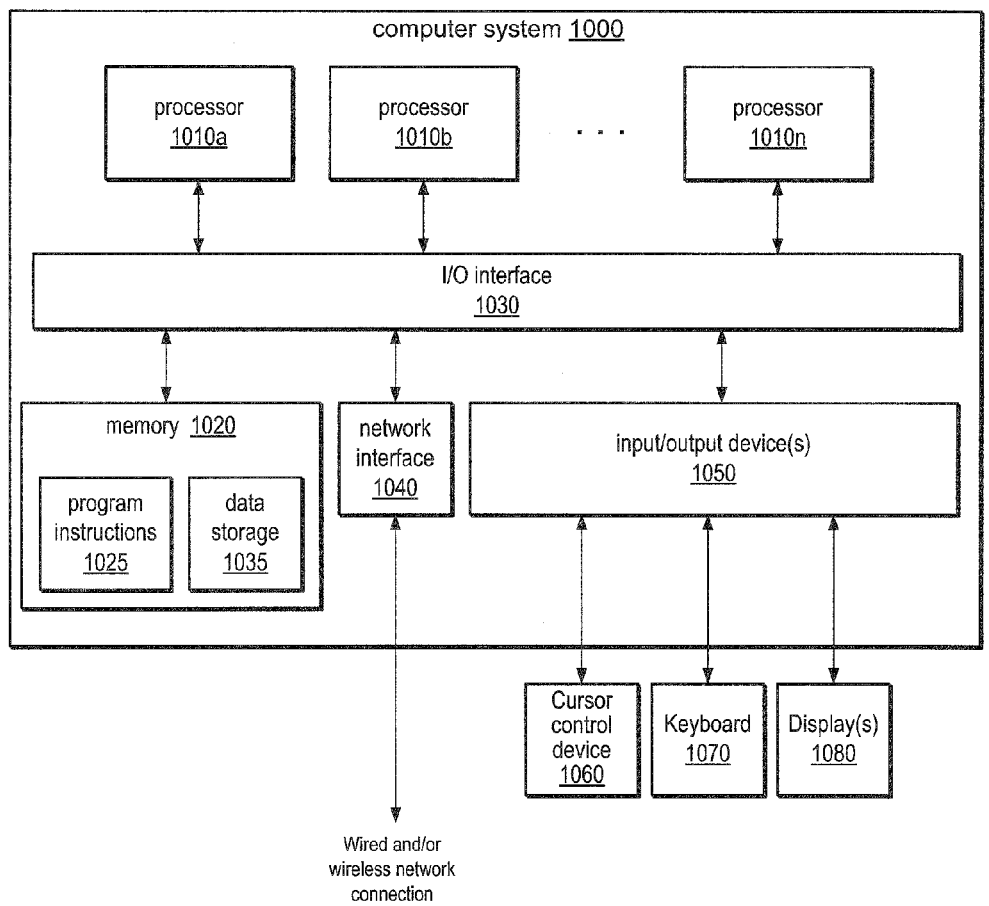
FIG. 16 illustrates an example computer system that may be used in embodiments.

Embodiments of rendering techniques, for example super-resolution rendering techniques, that may be used to render high-resolution output images from raw image data captured by embodiments of the various thin plenoptic cameras as described herein may be performed by a rendering module implemented by program instructions stored in a computer-readable storage medium and executable by one or more processors (e.g., one or more CPUs or GPUs) of a computer system or other device. FIG. 15 illustrates a rendering module rendering images from a flat captured, for example, by one of the various embodiments of a thin plenoptic camera as described herein. Rendering module 920 may, for example, implement super-resolution methods for rendering super-resolved images from flats captured using focused plenoptic cameras, as described in U.S. patent application Ser. No. 12/690,869, entitled "Super-Resolution with the Focused Plenoptic Camera" filed Jan. 20, 2010, U.S. patent application Ser. No. 12/957,312, entitled "Methods and Apparatus for Rendering Focused Plenoptic Camera Data using Super-Resolved Demosaicing" filed Nov. 30, 2010, and in U.S. patent application Ser. No. 12/957,316, entitled "Methods and Apparatus for Super-Resolution in Integral Photography" filed Nov. 30, 2010, all of which were previously incorporated by reference in their entirety. FIG. 16 illustrates an example computer system on which embodiments of rendering module 920 may be implemented. U.S. patent application Ser. No. 12/957,316 illustrates an example user interface for a rendering module 920 that may be used in some embodiments (note that other user interfaces may also be provided). In some embodiments of a focused plenoptic camera, rendering module 920 may be implemented in the camera, or in a device that includes the camera, e.g. in a captured data processing module. Referring to FIG. 15, rendering module 920 receives an input flat 910 captured by a camera as described herein, such as one of the embodiments of the thin plenoptic cameras illustrated in FIGS. 3 through 10. Rendering module 920 then processes the input image 910 according to an appropriate rendering method, for example one of the super-resolution rendering methods as described in U.S. patent application Ser. No. 12/690,869, U.S. patent application Ser. No. 12/957,312, and U.S. patent application Ser. No. 12/957,316. Rendering module 920 generates as output one or more images 930. Output image 930 may, for example, be stored to a storage medium 940, such as system memory, a disk drive, DVD, CD, etc. The dashed line from input image 910 to storage medium 940 indicates that the original (input) flat 910 may also be stored. The dashed line from storage medium 940 to rendering module 920 indicates that stored images may be retrieved and further processed by rendering module 920.

In some embodiments, rendering module 920 may provide a user interface 922 via which a user may interact with the module 920, for example to specify or otherwise manage input flats 910 and output images 930 as described herein. The user interface 922 may also provide one or more user interface elements whereby the user may select parameters of the super-resolution rendering method, such as the depth of focus or the super-resolution mode (2×2, 3×3, etc.), to be used to super-resolve a flat.

Example System

Embodiments of a rendering module and/or one or more of the various rendering methods that may be used to render images from raw image data captured by embodiments of the various thin plenoptic cameras as described herein may be executed on one or more computer systems, which may interact with various other devices. One such computer system is illustrated by FIG. 16. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some embodiments, computer system 1000 may be a digital camera.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the various rendering methods disclosed herein may be implemented at least in part by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a rendering module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 16, memory 1020 may include program instructions 1025, configured to implement embodiments of a rendering module as described herein, and data storage 1035, comprising various data accessible by program instructions 1025. In one embodiment, program instructions 1025 may include software elements of embodiments of a rendering module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a rendering module as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A camera, comprising:
   a photosensor configured to capture light projected onto the photosensor, the photosensor comprising a plurality of pixels;
   an objective lens, wherein the objective lens is configured to refract light from a scene located in front of the camera to form an image of the scene at an image plane of the objective lens;
   a plurality of microspheres positioned between the objective lens and the photosensor and proximate to the photosensor, each microsphere sampling a respective region of the image of the scene formed at the image plane by the objective lens; and
   a mask usable with the plurality of microspheres to reduce a size of each pixel included in the photosensor, the mask being positioned between the plurality of microspheres and the photosensor, the mask being a separate element from the photosensor;
   each microsphere being configured to project a respective region of the image of the scene sampled by the respective microsphere onto a separate location on the photosensor, each location including one or more pixel elements of the photosensor, and each microsphere and the mask affecting light passing through the microsphere and the mask to produce a pixel size of less than 500 nanometers (nm) at each pixel element.

2. The camera as recited in claim 1, wherein the mask includes a plurality of holes, each hole corresponding to a respective pixel element on the photosensor, and each hole of a size corresponding to the pixel size produced by the microspheres.

3. The camera as recited in claim 1, wherein each microsphere corresponds to one and only one pixel element.

4. The camera as recited in claim 1, wherein each microsphere corresponds to two or more pixel elements.

5. The camera as recited in claim 1, wherein the pixel size produced by the microspheres is within a range of approximately 50 nm to approximately 100 nm.

6. The camera as recited in claim 1, wherein the microspheres are of diameter between approximately 2 microns and approximately 10 microns.

7. The camera as recited in claim 1, wherein the microspheres have a refractive index (n) between approximately 1.4 and approximately 2.0.

8. The camera as recited in claim 1, wherein the size of each pixel included in the photosensor is reduced based, at least in part, on a refractive index associated with the plurality of microspheres.

9. The camera as recited in claim 1, wherein the image plane of the objective lens is behind the photosensor.

10. The camera as recited in claim 1, wherein raw image data captured by the photosensor is configured to be processed according to a super-resolution technique to render a high-resolution image of the scene.

11. The camera as recited in claim 10, wherein the camera further comprises at least one processor and a memory comprising program instructions that are executable by the at least one processor to implement the super-resolution technique.

12. The camera as recited in claim 1, wherein the camera is 5 millimeters (mm) or less in thickness.

13. A method, comprising:
   receiving light from a scene at an objective lens of a camera;
   refracting light from the objective lens to form an image of the scene at an image plane of the objective lens;
   receiving light from the image plane at a plurality of microspheres positioned between the objective lens and a photosensor and proximate to the photosensor, each microsphere sampling a respective region of the image of the scene formed at the image plane by the objective lens;
   reducing a size of each pixel included in the photosensor using a mask and the plurality of microspheres, the mask positioned between the plurality of microspheres and pixel elements of the photosensor, the mask being a separate element from the photosensor; and
   receiving light at the photosensor, each microsphere projecting a respective region of the image of the scene sampled by the respective microsphere onto a separate location on the photosensor, each location including one or more pixel elements of the photosensor, and each microsphere affecting light passing through the microsphere to produce a pixel size of less than 500 nanometers (nm) at each pixel element, 500 nm being approximately the wavelength of light.

14. The method as recited in claim 13, wherein the mask includes a plurality of holes, each hole corresponding to a respective pixel element on the photosensor, and each hole of a size corresponding to the pixel size produced by the microspheres.

15. The method as recited in claim 13, wherein each microsphere corresponds to one and only one pixel element.

16. The method as recited in claim 13, wherein the pixel size produced by the microspheres is within a range of approximately 50 nm to approximately 100 nm.

17. The method as recited in claim 13, wherein the microspheres are of diameter between approximately 2 microns and approximately 10 microns, and wherein the microspheres have a refractive index (n) between approximately 1.4 and approximately 2.0.

18. The method as recited in claim 13, wherein the objective lens has an aperture within a range of F/1 to approximately F/3.

19. The method as recited in claim 13, wherein the objective lens includes an array of microlens.

20. The method as recited in claim 13, further comprising:
   capturing a light-field image of the scene at the photosensor, wherein the light-field image includes each separate region of the image of the scene in a separate region of the light-field image; and
   processing the captured light-field image according to a super-resolution technique to render a high-resolution image of the scene.

21. The method as recited in claim 13, wherein the camera is 5 millimeters (mm) or less in thickness.

* * * * *